United States Patent
Yamada

(10) Patent No.: US 10,712,881 B2
(45) Date of Patent: Jul. 14, 2020

(54) INPUT DEVICE, OBJECT DETECTION DEVICE, AND METHOD THEREOF

(71) Applicant: ALPS ALPINE CO., LTD., Tokyo (JP)

(72) Inventor: Tomoki Yamada, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 132 days.

(21) Appl. No.: 15/840,291

(22) Filed: Dec. 13, 2017

(65) Prior Publication Data

US 2018/0101265 A1 Apr. 12, 2018

Related U.S. Application Data

(63) Continuation of application No. PCT/JP2016/067260, filed on Jun. 9, 2016.

(30) Foreign Application Priority Data

Jun. 18, 2015 (JP) .................................. 2015-122879

(51) Int. Cl.
*G06F 3/041* (2006.01)
*G06F 3/044* (2006.01)

(52) U.S. Cl.
CPC .............. *G06F 3/044* (2013.01); *G06F 3/041* (2013.01); *G06F 3/0418* (2013.01)

(58) Field of Classification Search
CPC .................................. G06F 3/041; G06F 3/044
See application file for complete search history.

(56) References Cited

U.S. PATENT DOCUMENTS

2008/0122798 A1 5/2008 Koshiyama et al.
2010/0193258 A1 8/2010 Simmons et al.
(Continued)

FOREIGN PATENT DOCUMENTS

EP 2256598 12/2010
JP 2008-117371 5/2008
(Continued)

OTHER PUBLICATIONS

International Search Report dated Aug. 23, 2016 in PCT/JP2016/067260 filed on Jun. 9, 2016.
(Continued)

*Primary Examiner* — Roy P Rabindranath
(74) *Attorney, Agent, or Firm* — IPUSA, PLLC

(57) ABSTRACT

Provided is an input device including a sensor part to detect approaching states of objects at detection positions and an adjacent region specification part to specify adjacent regions of the objects based on detection data from the sensor part. The adjacent region specification part specifies a peak detection position, of which a value of the detection data satisfies a certain peak condition among the detection positions, and conducts a label assigning process that assigns a label applied at the peak detection position to one or more detection positions among surrounding detection positions of the peak detection position. The label is not assigned to the one or more detection positions, and the detection data of the one or more detection positions indicate greater than or equal to a first threshold defined based on the detection data of the peak detection position being specified.

11 Claims, 17 Drawing Sheets

(56) References Cited

U.S. PATENT DOCUMENTS

| | | | | |
|---|---|---|---|---|
| 2010/0289754 A1* | 11/2010 | Sleeman | ............... | G06F 3/0416 345/173 |
| 2012/0075243 A1 | 3/2012 | Doi et al. | | |
| 2013/0057493 A1* | 3/2013 | Hwang | ................ | G06F 3/0418 345/173 |
| 2015/0042607 A1* | 2/2015 | Takanohashi | ......... | G06F 3/0416 345/174 |

FOREIGN PATENT DOCUMENTS

| | | |
|---|---|---|
| JP | 2010-533329 | 10/2010 |
| JP | 2012-068893 | 4/2012 |
| JP | 2013-541088 | 11/2013 |
| JP | 2015-032235 | 2/2015 |
| JP | 2015-125569 | 7/2015 |
| WO | 2012/034715 | 3/2012 |

OTHER PUBLICATIONS

Extended European Search Report for 16811544.2 dated Mar. 29, 2018.

* cited by examiner

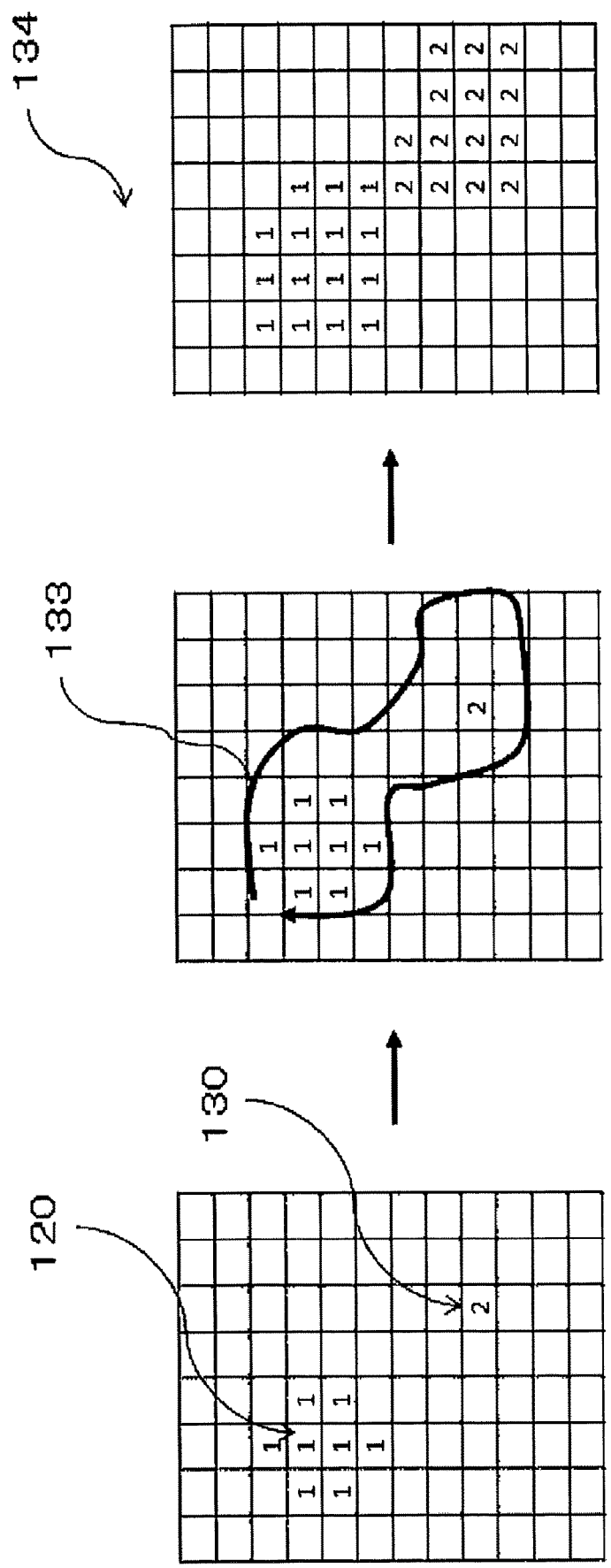

FIG.16

INPUT DEVICE, OBJECT DETECTION DEVICE, AND METHOD THEREOF

CROSS-REFERENCE TO RELATED APPLICATIONS

The present application is a continuation application of International Application No. PCT/JP2016/067260 filed on Jun. 9, 2016, which claims priority to Japanese Patent Application No. 2015-122879 filed on Jun. 18, 2015. The contents of these applications are incorporated herein by reference in their entirety.

BACKGROUND OF THE INVENTION

1. Field of the Invention

The present invention relates to an input device, an object detection device, and a method thereof.

2. Description of the Related Art

In a user interface device for each of various electronic devices such as a touch panel of a notebook type computer, a touch panel of a smartphone, or the like, it is required to detect, with a simple configuration, that an object (such as a finger or a pen) is close to or in contact with the touch panel. Therefore, a sensor that detects an approach or contact of the object by a change of an electrostatic capacitance has been widely used.

There is a sensor for detecting the change of the electrostatic capacitance, which realizes a hovering function capable of detecting an approach when the electrostatic capacitance is changed, not only in a case in which a finger contacts the touch panel but also in a case in which the finger is approaching. Patent Document 1 discloses an example of such a hovering function, and describes in particular a technology that changes detection resolution and detection sensitivity in stages as the finger approaches a panel surface and detects the finger sequentially in the stages.

As described above, because it is necessary to identify an object such as the finger distanced from the touch panel, the object is specified by identifying the object in image data, according to the change of the electrostatic capacitance. As methods for identifying the object, there is a method using a template matching and a method using binarization. In the template matching method, it is possible to store the template of the object to be identified and identify a plurality of objects by searching for whether there is no matched portion in an image. In the binarization method, the image data are binarized, by applying the label to the binarized data, the plurality objects can be separated and recognized.

CITATION LIST

Patent Document

[Patent Document 1]
Japanese Unexamined Patent Application Publication No. 2008-117371

SUMMARY OF THE INVENTION

Technical Problem

Template matching is effective when an object to be recognized is fixed; however, because it is required to prepare a plurality of templates to recognize objects of various types, template matching is unsuitable for recognizing an object such as a finger whose thickness, length, and tilt varies at every time. Moreover, in a method for binarizing and labeling, a number of objects recognized depends on a value of a threshold to binarize, and there may be some cases in which the number of fingers cannot be detected well by binarization.

Particularly, in a case in which three objects exist and the threshold is determined by focusing on a certain finger, a threshold for another finger is not appropriately determined such that the other object may be recognized as two objects. Particularly, in order to recognize objects with different heights and shapes of peaks for each object, a new recognition algorithm, which does not use pattern recognition or binarization, is needed.

The present invention has been made in view of such circumstances, and an object thereof is to provide an input device, which is capable of recognizing a plurality of objects with different shapes and distances at a high precision.

Solution to Problem

An input device according to the present invention includes: a sensor part configured to detect approaching states of a plurality of objects at a plurality of detection positions; and an adjacent specification part configured to specify adjacent regions of the plurality of objects based on detection data from the sensor part, wherein the adjacent region specification part includes a peak position specification part configured to specify a peak detection position, of which a value of the detection data satisfies a certain peak condition among the plurality of detection positions, and a label assigning part configured to conduct a label assigning process that assigns a label applied at the peak detection position to one or more detection positions among surrounding detection positions of the peak detection position, wherein the label is not assigned to the one or more detection positions, and the detection data of the one or more detection positions indicate greater than or equal to a first threshold defined based on the detection data of the peak detection position being specified.

According to this configuration, because the plurality of peak detection positions are detected and the label is assigned for surrounding detection positions for each of the peak detection positions, it is possible to identify the objects for each of the adjacent regions as the peak detection position is a center. Since, it is possible to assign the label for each of the adjacent regions having the peak detection position, it is possible to specify an appropriate adjacent region excluding a detection position to be noise. Accordingly, it is possible to improve accuracy of separating and recognizing the objects.

An object detection device of the present invention includes a peak specification part configured to specify a peak detection position, of which a value of detection data satisfies a certain peak condition among a plurality of detection positions, based on the detection data indicating approaching states of a plurality of objects at the plurality of detection positions; and a label assigning part configured to conduct a label assigning process that assigns a label applied at the peak detection position, to detection positions, to which the label is not assigned and of which the detection data indicate greater than or equal to a first threshold defined based on the detection data of the peak detection position being specified, among surrounding detection positions of the peak detection position.

An object detection method of the present invention includes a peak specification step for specifying a peak detection position, of which a value of detection data satisfies a certain peak condition among a plurality of detection positions, based on the detection data indicating approaching states of a plurality of objects at the plurality of detection positions; and a label assigning step for conducting a label assigning process that assigns a label applied at the peak detection position, to detection positions, to which the label is not assigned and of which the detection data indicate greater than or equal to a first threshold defined based on the detection data of the peak detection position being specified, among surrounding detection positions of the peak detection position.

According to an embodiment of the present invention, it is possible to provide an input device, which is capable of recognizing a plurality of objects with different shapes and distances at high precision.

BRIEF DESCRIPTION OF THE DRAWINGS

FIG. 14A through FIG. 14C are diagrams for explaining a case of conducting the outline tracing process and the label assigning process at the second time by using the examples illustrated in FIG. 2 and FIG. 6, in the first embodiment.

FIG. 16 is a diagram for explaining a case of conducting the detection process of the maximum peak detection position at a fourth time by using the examples illustrated in FIG. 2 and FIG. 6, in the first embodiment.

DETAILED DESCRIPTION OF THE PREFERRED EMBODIMENTS

First Embodiment

Figure 1:
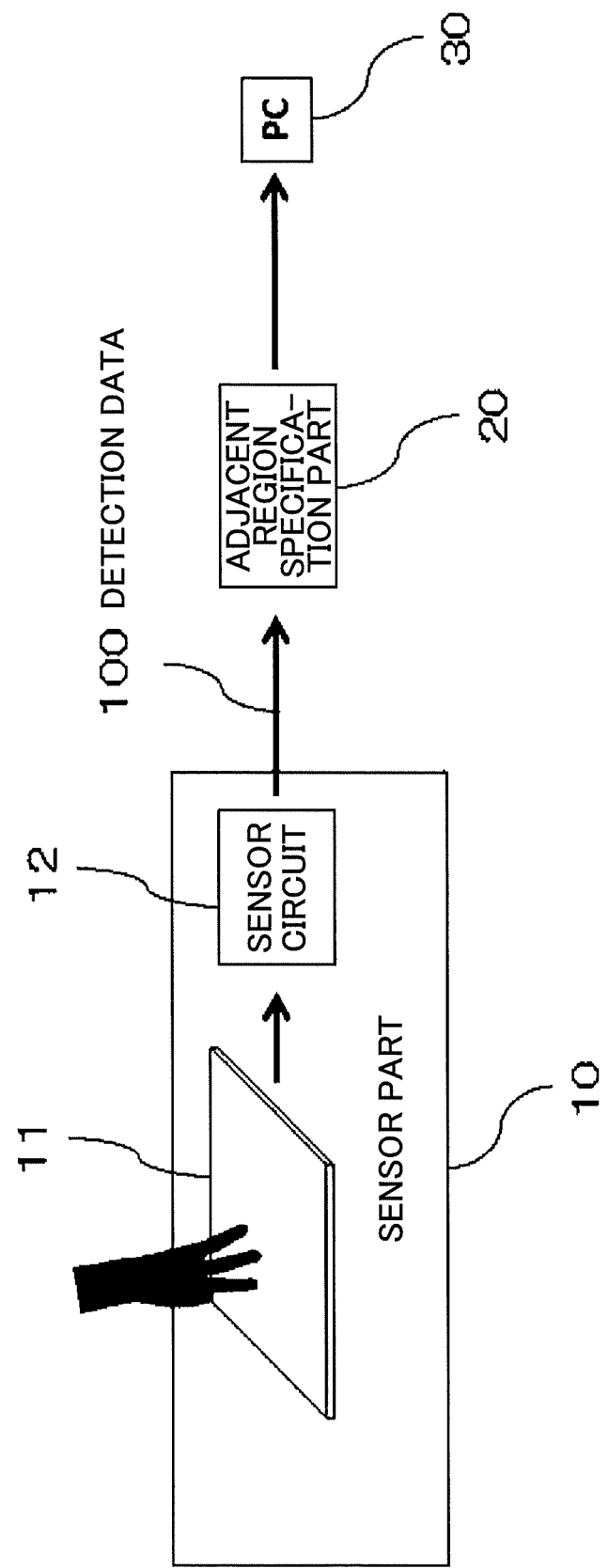
FIG. 1 is a diagram illustrating an input device according to an embodiment.

FIG. 1 is a diagram illustrating an input device according to a first embodiment. An input device 1 is preferably a capacitance type finger input device. The input device 1 includes a sensor part 10, an adjacent region specification part 20, and a PC 30. The sensor part 10 includes a detection part 11 and a sensor circuit 12, detects respective approaching states of a plurality of objects at multiple detection positions by reading electrostatic capacitance change due to approaching fingers, and sends detection data 100 to adjacent region specification part 20. For example, an approaching state is a state in which the finger or the like is approaching the input device 1, and indicates a distance, a location relationship, and the like between the approaching object and the input device 1.

The detection part 11 includes detection electrodes in a matrix, and when an object such as a finger or a stylus approaches the detection electrodes, the electrostatic capacitance formed between the detection electrodes and a ground varies. The electrostatic capacitance change being occurred is reported to the sensor circuit 12.

The sensor circuit 12 generates the detection data 100 formed by multi-valued data based on a change amount and change value of the electrostatic capacitance output from the detection part 11. The detection data 100 will be described later with reference to FIG. 2 and FIG. 3.

The adjacent region specification part 20 specifies adjacent regions of a plurality of objects based on the detection data 100 from the sensor part 10. For example, the adjacent region indicates a region occupied by a certain object on a plane of the matrix forming the detection part 11. In a case in which a plurality of objects such as a plurality of fingers, are approaching, the plurality of adjacent regions are generated by the plurality of objects. As result from specifying such adjacent regions, the adjacent region specification part 20 calculates a number of fingers and coordinates based on the detection data 100, and outputs a calculation result to the PC 30.

Figure 2:
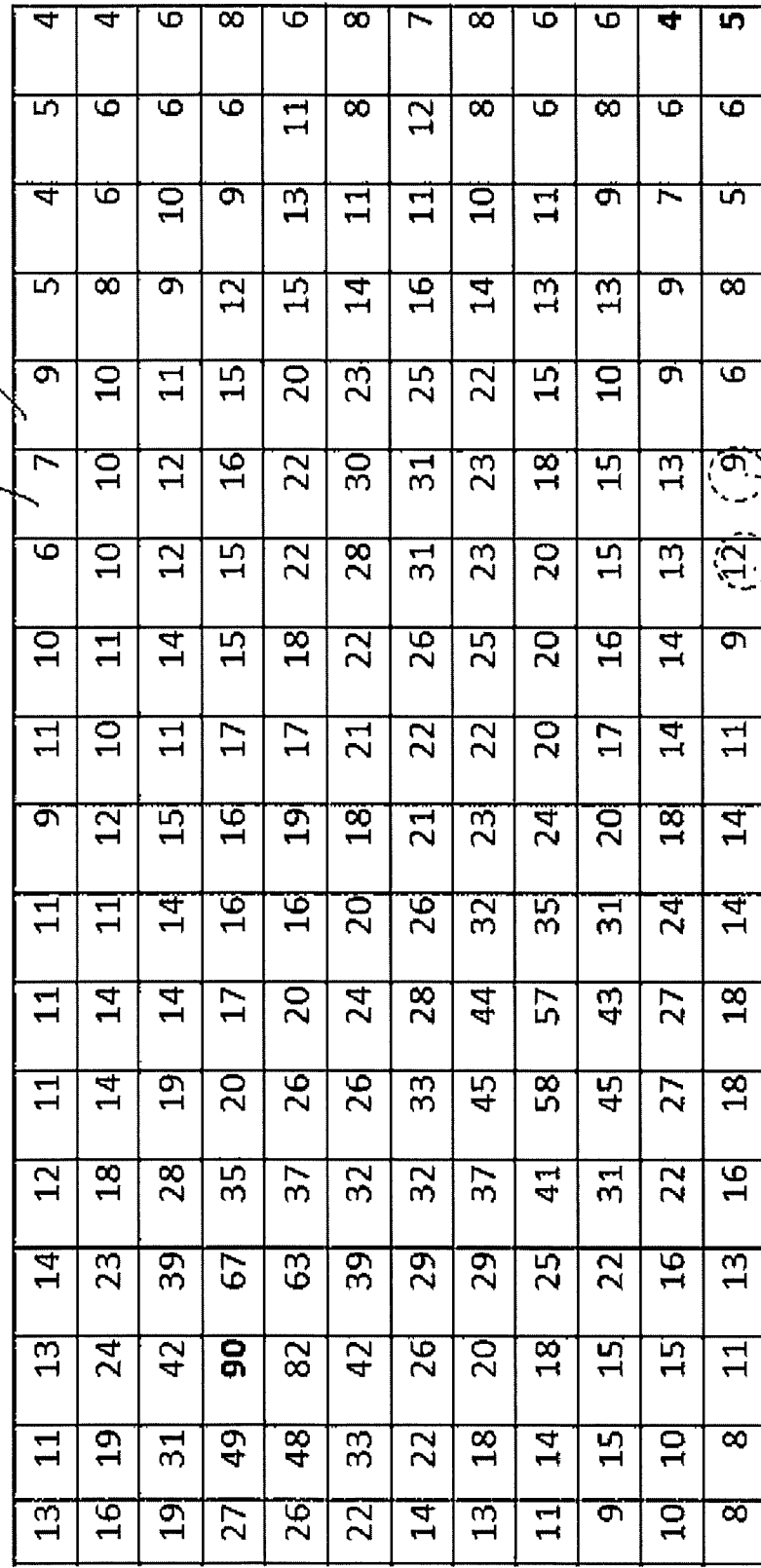
FIG. 2 is a diagram for briefly explaining detection data according to the embodiment.

FIG. 2 is a diagram for briefly explaining the detection data 100 which the sensor part depicted FIG. 1 outputs.

The approaching finger to the detection part 11 causes a change of the electrostatic capacitance as described above, and the closer the finger is approaching to the detection part 11, the greater a magnitude of the change is. The detection data 100 correspond to a value detected by a certain region unit as an upper limit of the change of the electrostatic capacitance is "99", and may be data depicted in FIG. 2, for example. The detection data 100 are formed by sets of detection data $100x$ respective to detection positions 105.

For example, in an example illustrated in FIG. 2, there is the detection data $100x$ indicating a value "90" in a frame being one of the detection positions 105 and being of a third from left and a fourth from a top. Since the change of the electrostatic capacitance is "90" out of "99" and is a greatest value among all sets of the detection data $100x$, it is inferred that the finger would have been closer to the detection position 105. Conversely, because values 4 and 5 are indicated in a lower right and are extremely small values, it is inferred that fingers are not close to this vicinity.

Figure 3:
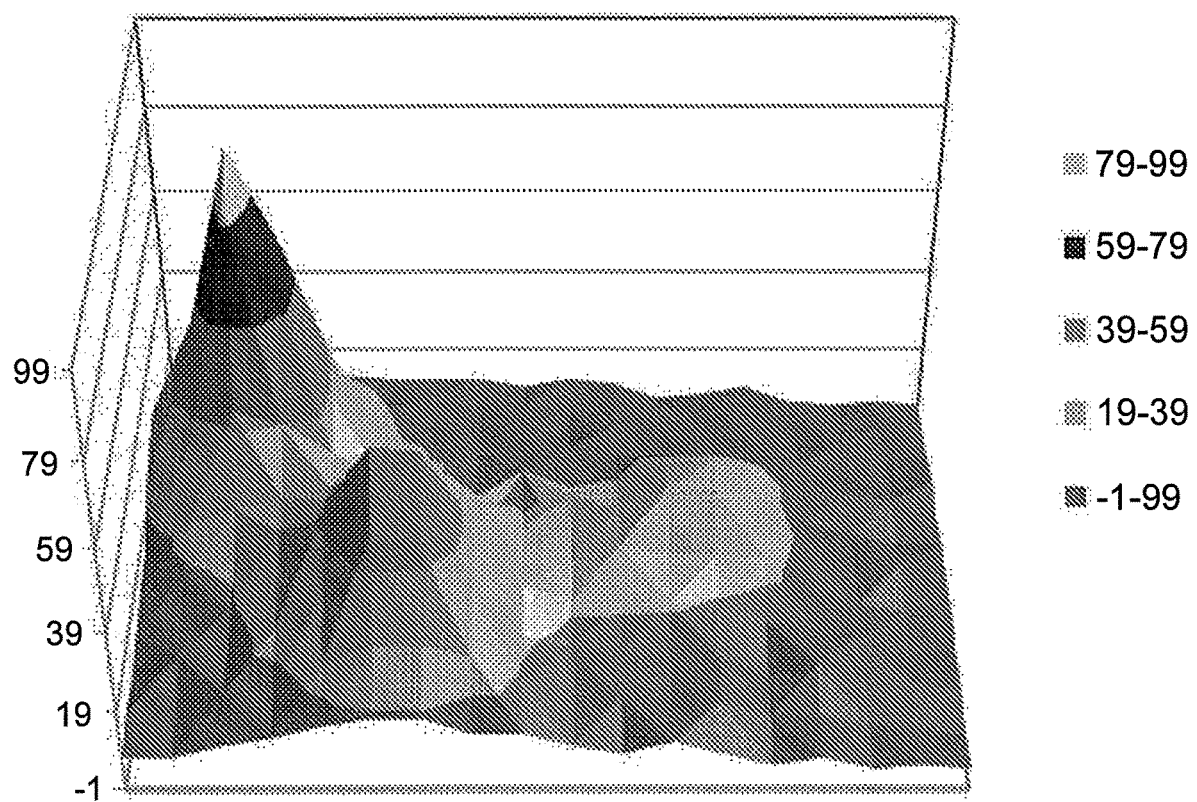
FIG. 3 is a diagram three-dimensionally illustrating an overview of the detection data according to the embodiment.

FIG. 3 is a diagram three-dimensionally illustrating an overview of the detection data 100 depicted in FIG. 1. In FIG. 2, the detection data 100 are illustrated as is values of multivalued data in plan. In FIG. 3, the multivalued data are depicted with height and shade of color. As illustrated in FIG. 3, high climaxes occur at an upper left portion, a lower right portion to the upper left portion, and a further upper right portion to the lower right portion.

Since peaks of electrostatic capacitance occur around each vertex, it is inferred based on the multivalued data that the finger or the like is approaching in this vicinity. It is noted that when instead of the multivalued data, a vicinity of this finger is depicted by binary data separating to upper and lower from a certain threshold, a contour can be captured; however, an inside and a separateness of the contour become unclear, and respective near states of the plurality of objects as depicted in FIG. 3 are difficult to be separated.

The input device 1 of the embodiment can recognize objects having different height and shape of peaks at high accuracy.

Figure 4:
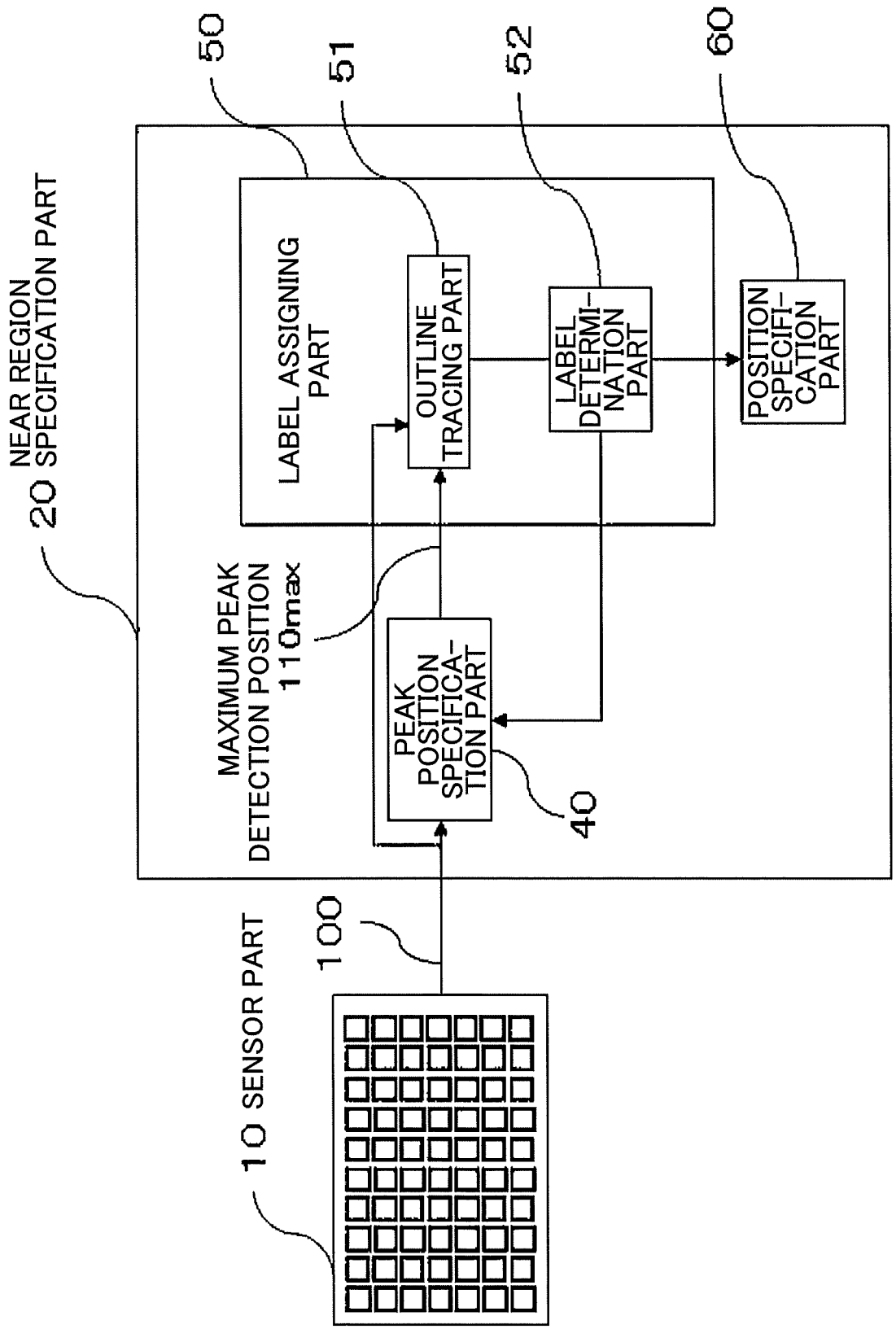
FIG. 4 is a functional block diagram of the input device according to the embodiment.

FIG. 4 is a functional block diagram of the input device 1 according to the first embodiment.

The input device 1 has been already described with reference to FIG. 1, and in FIG. 4, the adjacent region specification part 20 will be further described in detail.

As depicted in FIG. 4, the adjacent region specification part 20 includes a peak position specification part 40, a label assigning part 50, and a position specification part 60.

The peak position specification part 40 specifies a maximum peak detection position 110max indicating a maximum value satisfying a certain condition among a plurality of peak detection positions 110 in which values of the detection data 100 in a plurality of detection positions 105 satisfy a certain peak condition. In this case, data of a label described later and the detection data 100 are used.

The label assigning part 50 conducts a label assigning process for assigning a label, which has been already given to the maximum peak detection position 110max, with respect to the detection positions 105 where the label is not assigned and its detection data 100x are greater than or equal to a first threshold Th_Finger_p, among detection positions 105 surrounding the maximum peak detection position 110max specified by the peak position specification part 40.

The label to be assigned is a number or a symbol, which specifies each of adjacent regions and is unique for each of the adjacent regions. For example, the label is a serial number and is assigned such that a label to be assigned first is 1, a next label is 2, a further following label is 3, and the like. If no duplication is desired, it is not necessary to limit to the serial number, and other numerals and symbols may be used.

The label assigning part 50 includes an outline tracing part 51 that forms an outline with respect to the detection data 100, and a label determination part 52 that determines the label assigned to the formed outline.

The outline tracing part 51 specifies detection positions whose values are smaller than or equal to the detection data 100x of the maximum peak detection position 110max, as the outline where the label assigning process is conducted. In this case, label data, the detection data 100, and the maximum peak detection position 110max are used. A process of the outline tracing part 51 will be described with reference to FIG. 9. A process of the label determination part 52 will be described with reference to FIG. 10.

Therefore, the label determination part 52 conducts the label assigning process for the detection positions 105 in the outline for each of specified outlines. The label determination part 52 conducts a process for each of the specified outlines so as to assign a label near to the detection position 105 with respect to the detection position 105 in the outline if there are two or more labels in the outline, and so as to assign a label with respect to the detection position 105 in the outline if there is one label in the outline.

The adjacent region specification part 20 repeats an update of the maximum peak detection position by the peak position specification part 40 and an update of the label by the label assigning part 50, until there becomes no peak detection position satisfying a condition of the maximum peak detection position 110max.

The position specification part 60 specifies each of near positions respective to the plurality of objects based on the labels assigned by the label assigning part 50. The label is assigned for each of the adjacent regions by the process of the label assigning part 50; however, the position specification part 60 assigns certain position information for this label and each of the adjacent regions, specifies the near position, which indicates a location of the label and the adjacent regions by this position information and is to be coordinates of the label, and updates information of the near position if the information has been possessed. As the near position, for example, a barycentric value of the detection positions in the adjacent region where the label is assigned is used; however, a value itself of the peak detection position 110 in the label may be used.

Figure 5:
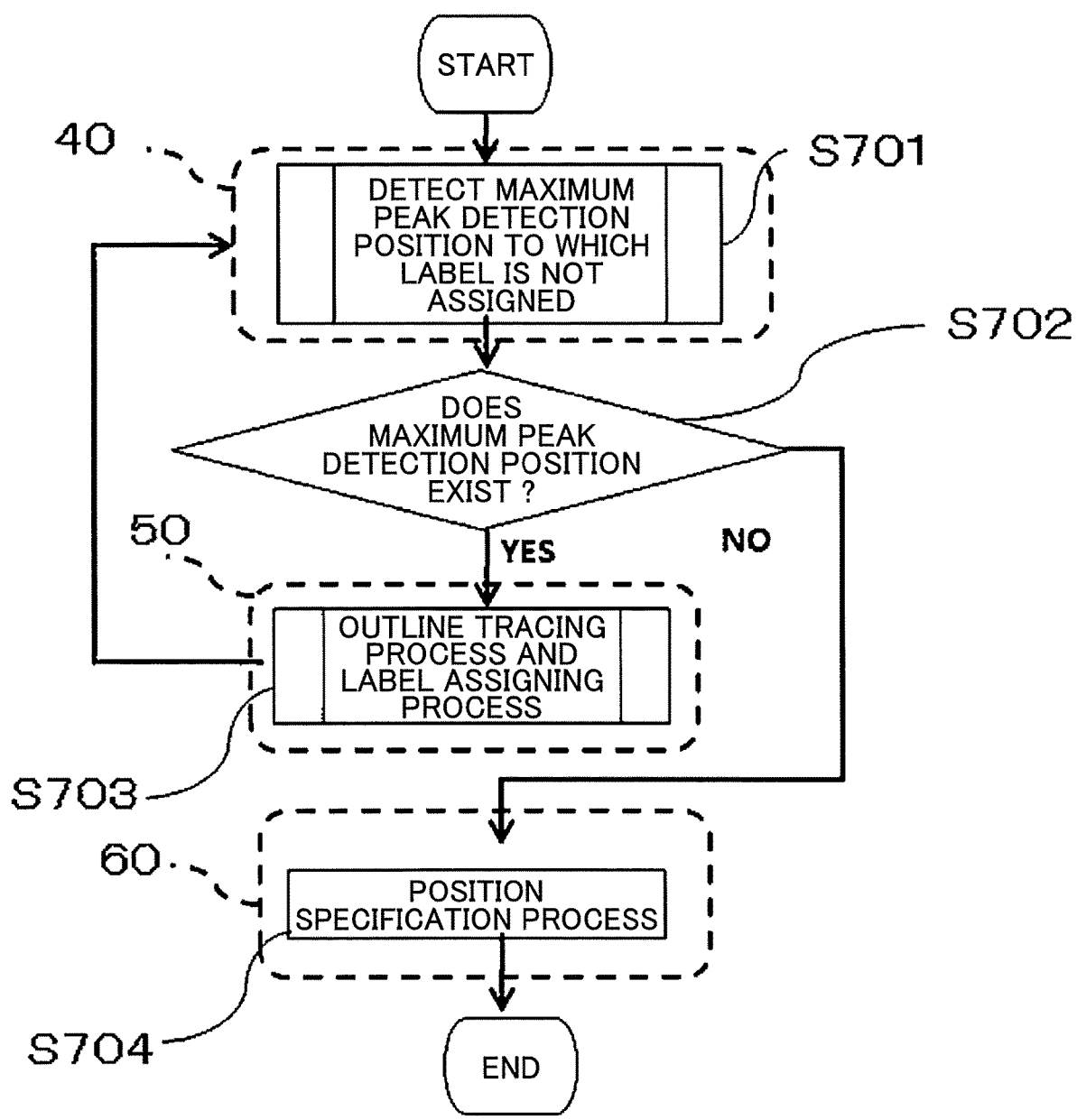
FIG. 5 is a flowchart for explaining a process of an adjacent region specification part depicted in FIG. 4.

FIG. 5 is a flowchart for explaining the process of the adjacent region specification part 20 depicted in FIG. 4.

Step S701:

The peak position specification part 40 detects the maximum peak detection position 110max based on the detection data 100 input from the sensor part 10 and the label data from the label assigning part 50. At this time, the peak position specification part 40 detects the maximum peak detection position 110max as the detection position 105 where the label is not assigned is a subject.

Step S702:

The peak position specification part 40 determines whether the maximum peak detection position 110max is detected in step S701, advances to step S703 for a positive determination, and terminates a series of processes for a negative determination.

In the embodiment, a process for detecting the maximum peak detection position in step S701 is conducted again after an outline tracing process and the label assigning process in step S703, and these are repeated until there becomes no maximum peak detection position.

Step S703:

The label assigning part 50 conducts the outline tracing process and the label assigning process for the maximum peak detection position 110max detected in step S701.

Step S704:

The position specification part 60 specifies the near positions of the plurality of objects, respectively, based on the label assigned by the label assigning part 50 in step S703.

In the following, a process of the peak position specification part 40 illustrated in FIG. 4 will be described in detail.

Figure 6:
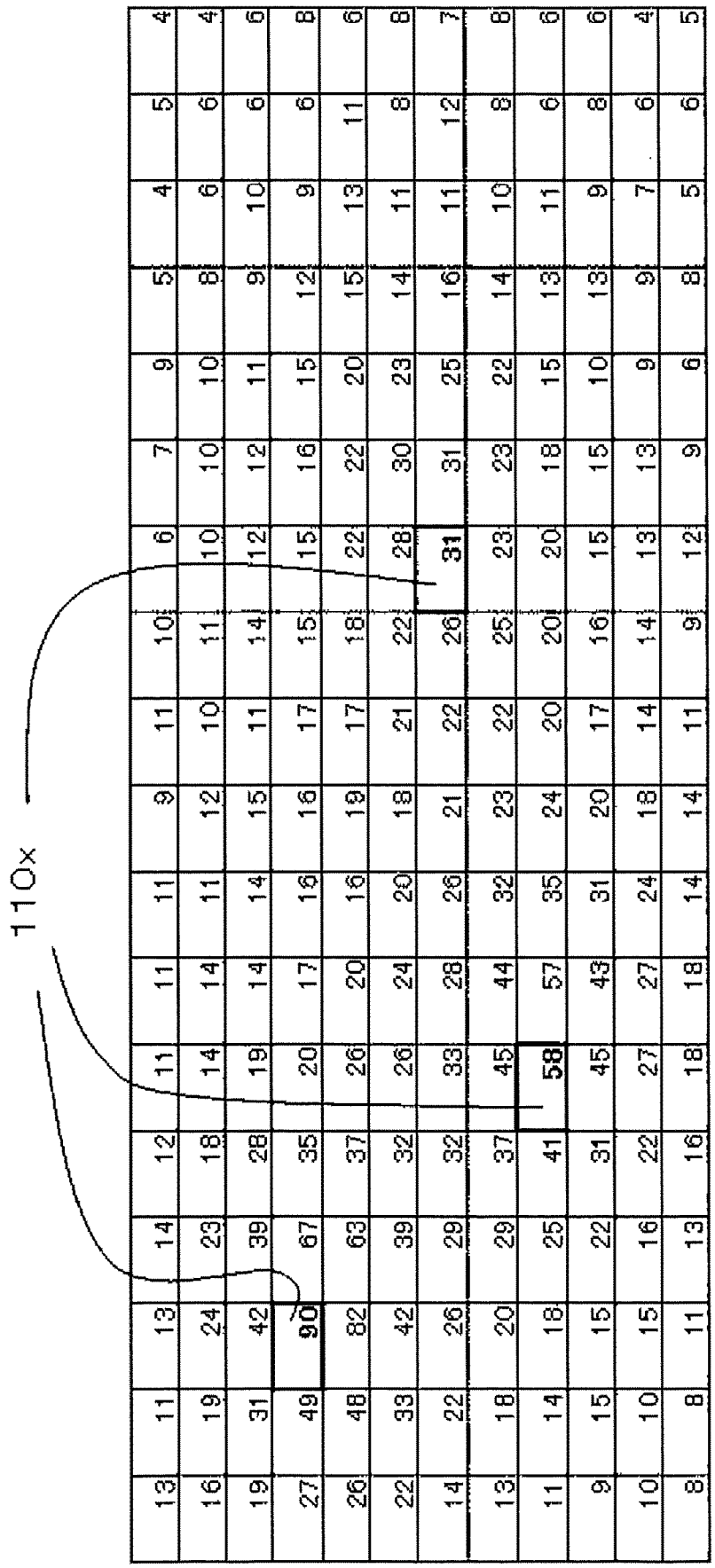
FIG. 6 is a diagram for explaining a peak detection process of a peak position specification part depicted in FIG. 4.

FIG. 6 is a diagram for explaining a peak detection process of the peak position specification part 40 depicted in FIG. 4.

Each of the peak detection positions 110 depicted in FIG. 6 is a detection position 105 satisfying a peak condition, in which its peak detection data 100x is greater than or equal to a second threshold Th_Exist and the detection data are greater than those at surrounding detection positions among the plurality of detection positions 105. The peak position specification part 40 specifies the detection position 105 obtained here as the peak detection position 110.

For example, in FIG. 6, as the detection data 100x of the detection position 105, there are three values: "90", "58", and "31". In a case in which the second threshold Th_Exist is "20", all these values exceed the second threshold Th_Exist. Moreover, surroundings of the detection position 105 having the value "90" indicate values "31", "47", "39", "67", "48", "82", and "63", and "90" is greater than any of the values at the surroundings of the detection position 105. Since the values "58" and "31" are similar to the value "90" and satisfy these conditions, these values satisfy the peak condition and are detected as the peak detection positions 110.

Also, the peak position specification part 40 determines the second threshold Th_Exist based on a maximum value of a change value of the detection data 100x. Because the maximum value is "90" in this case, the peak position specification part 40 determines "20" as the second threshold Th_Exist based on the value "90".

Figure 7:
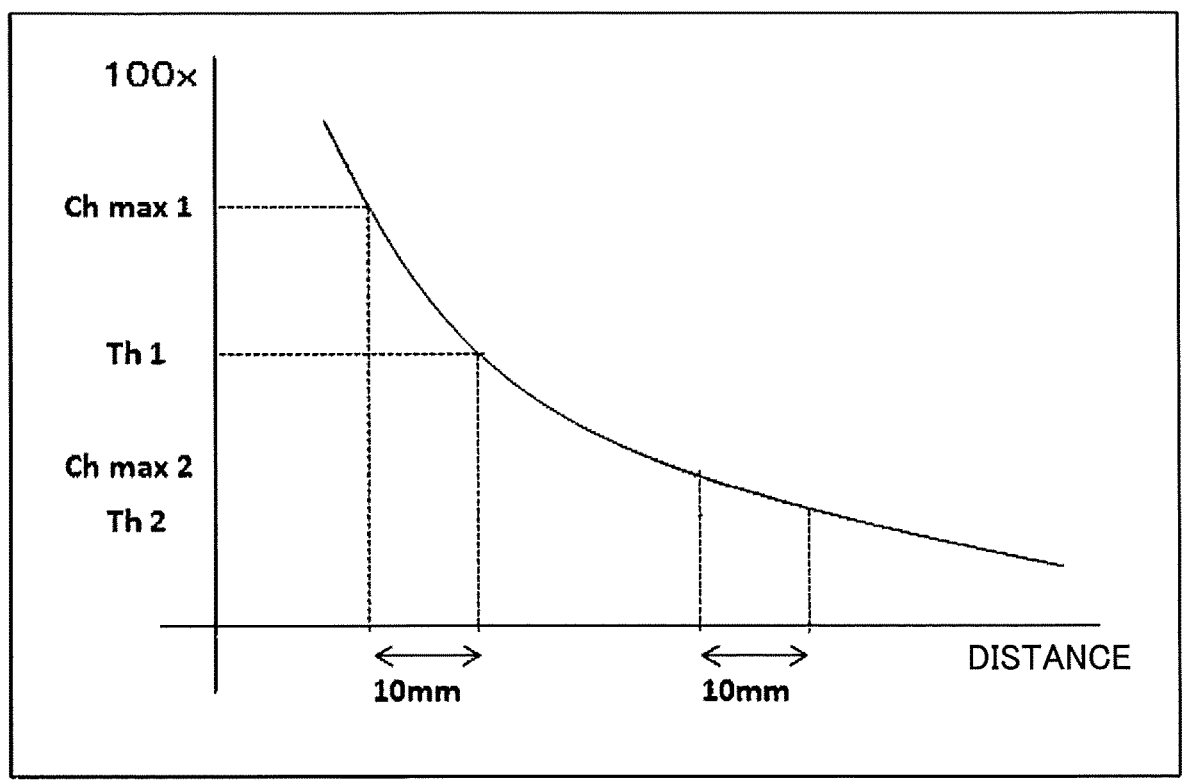
FIG. 7 is a graph illustrating a relationship between the detection data according to the embodiment and a distance of an object.

Also, the second threshold Th_Exist will be described as a fixed value in the embodiment; however, because a change value of the electrostatic capacitance tends to decrease as a position of the finger becomes farther from the detection part 11, the second threshold Th_Exist may be also set according to this decreasing tendency so as to decrease as the distance is farther. For example, the peak position specification part 40 can be set based on a relationship between the detection data 100x depicted in FIG. 7 and the distance of the object to be inversely proportional or nonlinearly to the distance.

Figure 8:
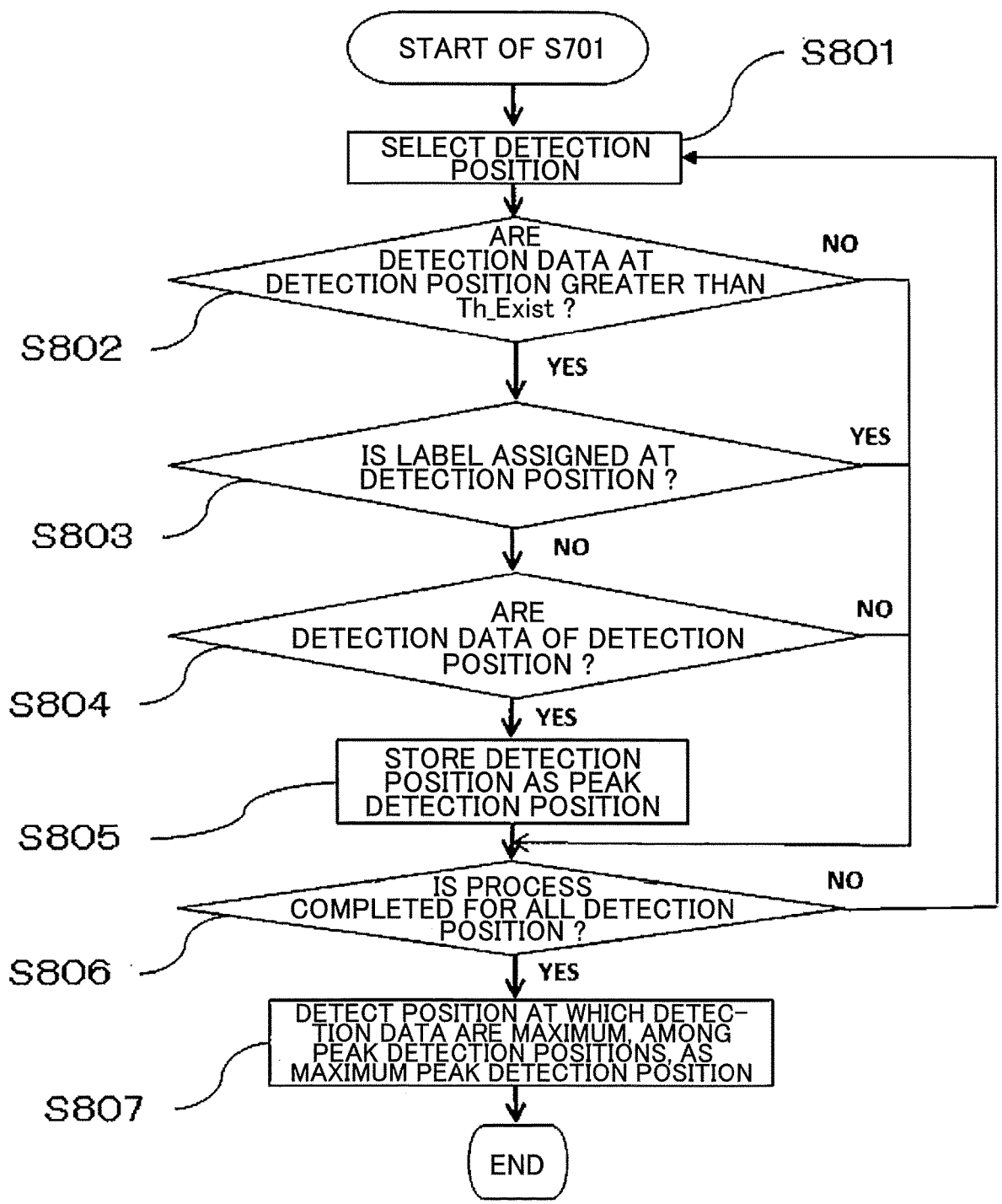
FIG. 8 is a flowchart for explaining a maximum peak detection position detection process, which the peak position specification part depicted in FIG. 4 conducts.

The peak position specification part 40 obtains the aforementioned peak detection position 110 based on the second threshold Th_Exist determined as described above. Referring to FIG. 8, this process will be described with reference to FIG. 8.

FIG. 8 is a flowchart for explaining a detection process of the maximum peak detection position that the peak position specification part 40 illustrated in FIG. 4 conducts in step S701 depicted in FIG. 5.

First, the peak position specification part 40 selects the detection position 105 of a process subject (step S801). That is, one is selected as the detection position 105. For example, an order of selecting the detection position 105 begins from a top left, and the detection position 105 may be sequentially selected one by one to the right in the detection data 100x illustrated in FIG. 2. When a row is completed, the order may move one below and the detection position 105 may be selected in a further row. Alternatively, the detection position 105 may be selected one by one downward. When a column is completed, the order may shift by one to the right, and the detection position 105 may be selected in a further column. Also, the order is not limited to begin from the top left. It can be considered to begin from one of various positions such as a top right, a bottom right, a bottom left, a center, and the like.

Next, regarding the detection position 105 selected in step S801, the peak position specification part 40 compares and determines whether a value (that is, the change amount of the electrostatic capacitance) indicated by the detection data 100x is greater than the second threshold Th_Exist (step S802). For example, in a case in which Th_Exist is set as "20", if the detection data 100 of the detection position 105 indicate "25", the determination becomes Yes, and if the detection data 100 indicate "10", the determination becomes No. When the detection data 100 of the detection position 105 is smaller (Step S802: No), the peak position specification part 40 advances to step S806.

When the detection data 100 of the detection position 105 is greater (Step S802: Yes), the peak position specification part 40 determines whether the label is assigned to the detection position 105, by referring to the label data (object range data) from the label determination part 52 (step S803). The label will be described later; however, that the label is attached means that the maximum peak detection position 110max is specified in an area including the detection position 105. Accordingly, when there is the label (step S803: No), the peak position specification part 40 advances to step S806.

Next, when there is no label (step S803: Yes), the peak position specification part 40 determines whether the detection data 100x of the detection position 105 is greater than the detection data 100x of eight neighbors at its surrounding (step S804). As described above with reference to FIG. 6, for example, the detection data 100x of the detection positions 105 surrounding the detection position 105 for the detection data 100x indicating "90" are "31", "47", "39", "49", "67", "48", "82", and "63", and "90" is greater than these values. In this case, the peak position specification part 40 determines that the detection data 100 of the detection position 105, where the detection data 100x indicates "90", is greater than the detection data 100 of the eight neighbors at its surrounding, that is, the peak condition is satisfied (step S804: Yes), and records the detection position 105 as the peak detection position 110 (step S805).

After the peak position specification part 40 stores the detection position 105 as the peak detection position 110 (step S805), or when the detection data 100 of the detection position 105 is smaller than either set of the detection data 100 of the eight neighbors at its surrounding (step S804: No), the process regarding the detection position 105 ends. Subsequently, the peak position specification part 40 determines whether a peak position detection process is conducted for all detection positions 105 (step S806). Then, in a case of a negative determination (step S806: No), the peak position specification part 40 advances to a next detection position 105 and performs a series of processes in the same manner.

When determining that the peak position detection process is conducted for all detection positions 105 (step S806: Yes), the peak position specification part 40 detects a maximum detection data 100x among a plurality of extracted peak detection positions 101, as the maximum peak detection position 110max (step S807). For example, when the detection data 100x of the peak detection position 110 as illustrated in FIG. 6 indicate "90", "58", and "31", the peak position specification part 40 detects the detection position 105 where the detection data 100x indicate "90" as the maximum peak detection position 110max.

By the above described detection process of the maximum peak detection position depicted in FIG. 5 by the peak position specification part 40 (step S701), in a case of an example illustrated in FIG. 6, the peak position specification part 40 specifies the detection positions 105 where the detection data 100x indicates "90", "58", and "31" as the peak detection position 110. Subsequently, the peak position specification part 40 detects the detection position 105 where the detection data 100x indicates the maximum value "90", as the maximum peak detection position 110max.

In the following, the label assigning part 50 illustrated in FIG. 4 will be described in detail.

As illustrated in FIG. 4, for example, the label assigning part 50 includes the outline tracing part 51 and the label determination part 52. The label assigning part 50 conducts the label assigning process of step S703 illustrated in FIG. 5.

For example, the label assigning part 50 conducts the label assigning process with respect to the detection position 105 based on the maximum peak detection position 110max described in step S701 of FIG. 5 and with reference to FIG. 8.

In the following, processes of the outline tracing part 51 and the label determination part 52 of the label assigning part 50 will be described in detail.

Figure 9:
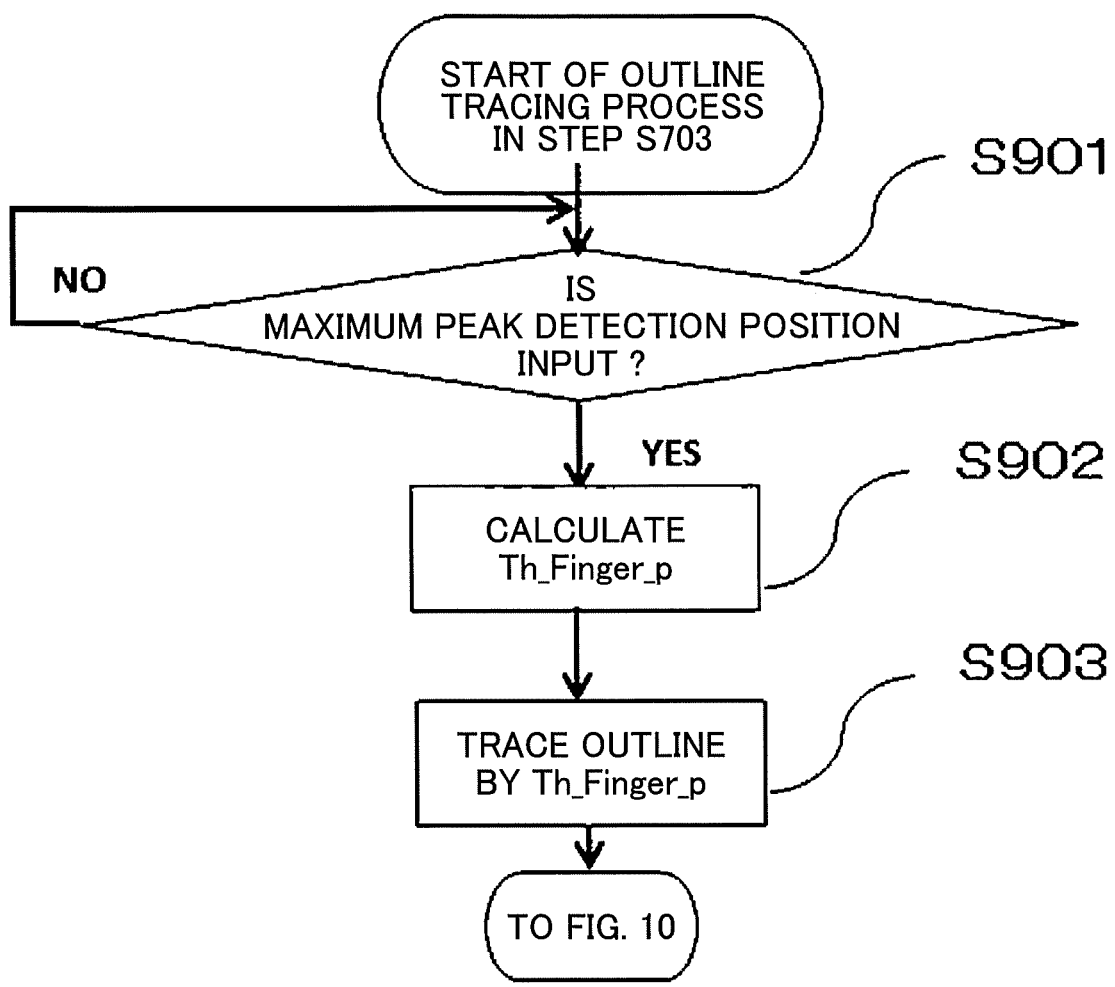
FIG. 9 is a flowchart for explaining an outline tracing process, which an outline tracing part depicted in FIG. 4 conducts.

FIG. 9 is a flowchart for explaining the outline tracing process conducted by the outline tracing part 51 illustrated in FIG. 4. When conducting an update process of an object range in step S703 illustrated in FIG. 5, the outline tracing process starts.

Step S901:

First, the outline tracing part 51 determines where the maximum peak detection position 110max is input from the peak position specification part 40, advances to step S902 in a case of a positive determination, and repeats this determination in a case of a negative determination. The outline tracing part 51 advances to step S902 in the case of the positive determination.

Step S902:

The outline tracing part 51 assigns a new label to the maximum peak detection position 110max. Next, the outline tracing part 51 conducts the label assigning process depicted below with respect to the detection positions 105 of the surroundings based on the maximum peak detection position 110max.

In the embodiment, the label described in step S701 illustrated in FIG. 5 is assigned.

The outline tracing part 51 calculates the first threshold Th_Finger_p based on the detection data 100x of the maximum peak detection position 110max input in step S901 (step S902).

Among the detection positions 105, a detection position 105 having a value greater than the first threshold Th_Finger_p as the detection data 100 is regarded as being in the range of the object, and a detection position 105 having a value smaller than or equal to the first threshold Th_Finger_p is regarded as being outside the range of the object, so that an outline of the range of the object is specified.

The first threshold Th_Finger_p is derived by a calculation formula so as to be a value smaller than the detection data 100 of the maximum peak detection position 110max. Moreover, the first threshold Th_Finger_p is set to be a threshold such that a noise due to a peak is absorbed; however, a peak due to a finger is not absorbed. The first threshold Th_Finger_p may be a value prepared beforehand; however, the first threshold Th_Finger_p may be calculated based on a formula, or may be calculated by multiplying the detection data 100x of the maximum peak detection position 110max by a constant coefficient. For example, in an example illustrated in FIG. 6, regarding the maximum peak detection position 110max where the detection data 100x is "90", for example, the first threshold Th_Finger_p is set to be "41".

Step S903:

The outline tracing part 51 conducts an outline trace by using the first threshold Th_Finger_p calculated in step S902 (step S903). That is, the outline tracing part 51 forms an outline, in which the detection position 105 where the detection data 100x is greater than the first threshold Th_Finger_p is in the range of the object. The outline to be formed is not limited to one, and in this case, the detection part 11 traces a plurality of outlines from one first threshold Th_Finger_p. Following the outline trace process of the outline tracing part 51, the label assigning process by the label determination part 52 illustrated in FIG. 10 is conducted.

Figure 10:
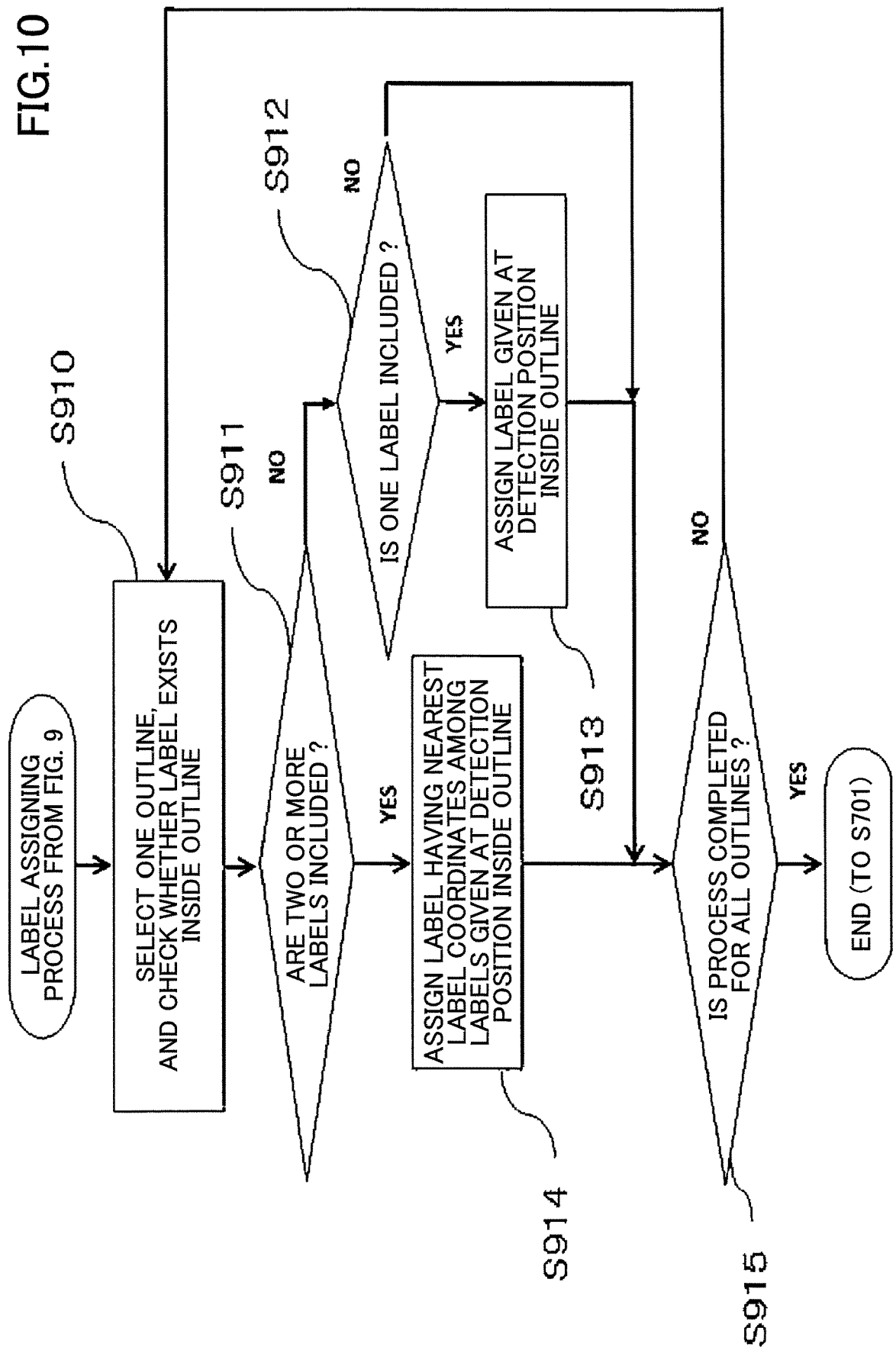
FIG. 10 is a flowchart for explaining a label assigning process, which a label determination part depicted in FIG. 4 conducts.

FIG. 10 is a flowchart for explaining the label assigning process of step S703 illustrated in FIG. 5, which is conducted by the label determination part 52 depicted in FIG. 4.

The process illustrated in FIG. 10 is conducted following the outline tracing process depicted in FIG. 9.

Since a plurality of outlines are formed in the outline tracing process described by referring to FIG. 9, the label determination part 52 selects one from the plurality of outlines, and checks whether the label is assigned to the detection positions 105 inside the one outline (step S910). In a case of one outline, that outline becomes a selection subject.

Next, the label determination part 52 determines whether there are two or more labels in a selected outline (step S911), and advances to step S913 when two or more labels are included or to step S912 when zero or one label is included. For example, when step S703 is conducted first, because only a first label assigned in step S902 described above, a number of labels in the selected outline indicates 0 or 1, and thus, the label determination part 52 advances to step S912.

However, in the embodiment, as illustrated in FIG. 5, returning to step S701 after an end of the label assigning process in step S703, a new maximum peak detection position 110max is detected by the peak position specification part 40, and a new label assigning process is conducted with respect to the new maximum peak detection position 110max. That is, a label is added. Therefore, the number of labels is not limited to 0 or 1, and may be two or more. In this case, a positive determination is resulted in step S911, and a process of step S914 is conducted.

However, when it is determined that two or more labels are not included (step S911: No), the label determination part 52 determines whether the number of labels being included indicates 1 (step S912). When it is determined that none of the labels is included (step S912: No), that is, it is considered that the maximum peak detection position 110max is not included inside the outline, a new labeling process is not conducted for an inside of this outline, and the label determination part 52 advances to step S915.

When it is determined that one label is included (step S912: Yes), the label determination part 52 fills all detection positions 105 in a range corresponding to the inside of the outline (step S913), and advances to step S915.

However, when it is determined that two or more labels are included in step S911 (step S911: Yes), because one label alone is applied to the detection position 105, it is necessary to determine to which label the detection positions 105 inside the outline belongs. Accordingly, the label determination part 52 assigns a label having closest label coordinates among a plurality of labels to the detection positions 105 in the range corresponding to the inside of the outline (step S914), and advances to step S915.

In detail, regarding a certain detection position 105 in the outline, the label determination part 52 calculates distances to a label A and a label B in the outline and assigns a nearest label to the detection position 105 of the process subject. For example, in a case in which coordinates of the label A are (3, 3) and coordinates of the label B are (4, 4), because the label A is closer, the label A is assigned. However, in a case in which coordinates of the detection position 105 of the process subject are (5, 6), because the label B is closer, the label B is assigned. This is performed for all detection positions 105 in the outline.

Next, the label determination part 52 determines whether the label assigning process is conducted for all outlines formed by the outline tracing process described by referring to FIG. 9 (step S915). In a case of a negative determination (step S915: No), the label determination part 52 returns to step S910, and preforms the label assigning process for a next outline. However, in a case of a positive determination (step S915: Yes), the label determination part 52 terminates the label assigning process for the maximum peak detection position 110max of a current process subject.

When the adjacent region specification part 20 illustrated in FIG. 4 terminates a label determination process, the peak position specification part 40 begins a maximum peak detection position detection process of step S701 illustrated in FIG. 5, and conducts a process for detecting the maximum peak detection position 110max among detection positions 105 to which the label is not assigned.

Next, when the adjacent region specification part 20 determines whether the maximum peak detection position 110max does not exist in step S702 illustrated in FIG. 5, a position specification process by the position specification part 60 is conducted (step S704).

The position specification part 60 conducts the position specification process (step S704 illustrated in FIG. 5) for specifying respective near positions respective to a plurality of objects approaching to the detection part 11, based on coordinates (position information) of the detection positions 105 to which the label determination part 52 assigns the labels.

For example, the position specification part 60 specifies a barycentric position to which the label is assigned as the near position of the object corresponding to the label for each of labels assigned to the detection positions 105 by the label determination part 52. In a near position specification method of the object by the position specification part 60, there is no particular limitation as long as a method using the label and the detection positions 105 to which the labels are assigned.

A process of the adjacent region specification part 20 illustrated in FIG. 4 will be described by using the detection data 100 illustrated in FIG. 2 and FIG. 6 as an example.

In this example, as illustrated in FIG. 6, three peak detection positions 110 where the detection data 100x indicate "90", "58", and "31", a positive determination is made three times at a determination process of step S702 illustrated in FIG. 5, and processes (the outline tracing process and the label determination process) are repeated three times.

In the following, the processes of this example will be described in order.

Figure 11:
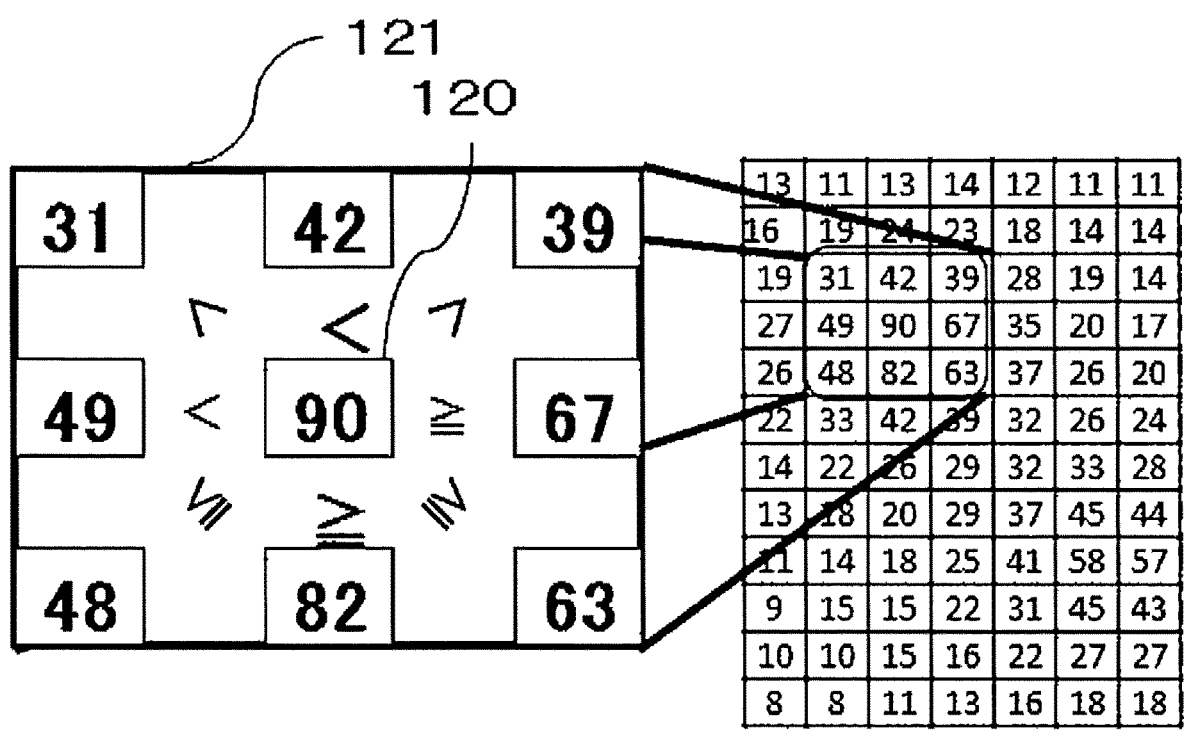
FIG. 11 is a diagram for explaining a case of conducting a detection process of the maximum peak detection position at a first time by using examples illustrated in FIG. 2 and FIG. 6, in a first embodiment.

FIG. 11 is a diagram for explaining a case of conducting the process of step S701 illustrated in FIG. 5 and FIG. 8 by using examples illustrated in FIG. 2 and FIG. 6.

Regarding the peak detection positions 110 illustrated in FIG. 6, when conducting a maximum peak detection position detection process illustrated in FIG. 8 for a first time, as depicted in FIG. 11, the detection position 105 (hereinafter, referred to as a detection position 120) where the detection data 100 indicate "90" is detected as the maximum peak detection position 110max.

That is, the peak position specification part 40 also specifies detection data 100x indicating a maximum value among the peak detection positions 110 to be subjects. As illustrated in FIG. 8, the peak detection positions 110 are the detection positions 105, of which their detection data 100x are greater than the second threshold Th_Exist (in this example, assumed as "20"), and to which the label is not assigned, and each of them has the detection data 100x greater than the detection positions 105 of eight neighbors at its surrounding.

In a first process of step S701 illustrated in FIG. 5, the value "90" of the detection data 100 at the detection position 120 illustrated in FIG. 11 is greater than the second threshold Th_Exist being "20". Moreover, the label is not assigned to the detection position 120. Also, as illustrated in FIG. 11, "90" of the detection data 100x of the detection position 120 indicates a value greater than the detection data 100 of eight neighbors at its surrounding. Therefore, the detection position 120 satisfies a peak requirement as the peak detection position 110. Moreover, since the detection data 100 of the detection position 120 indicates the maximum value, the detection position 120 is detected as the maximum peak detection position 110max.

As illustrated in surrounding data 121, the peak position specification part 40 allows the same value for four neighbors: right, bottom left, bottom, and bottom right, while conducting a comparison in order to exclude the same value for four neighbors: upper left, top, upper right, and left, during the comparison with the 8 neighbors. This is a measure for when the same values are arranged. If a comparison, which does not allow the same value for all 8 neighbors, a definition of a peak pixel is not satisfied in a case in which the same values are arranged. For example, in a case in which a detection position 105 at right of a detection position 105 having a value of "90" as the detection data 100x also has the value of "90", if the same value is not allowed, neither "90" satisfies a requirement of the peak detection position 110.

Figure 12C:
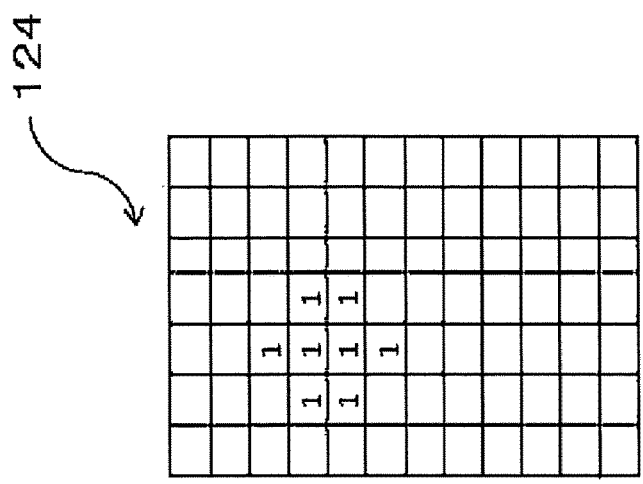
FIG. 12A through FIG. 12C are diagrams for explaining a case of conducting the outline tracing process and the label assigning process at the first time by using the examples illustrated in FIG. 2 and FIG. 6, in the first embodiment.
Figure 12B:
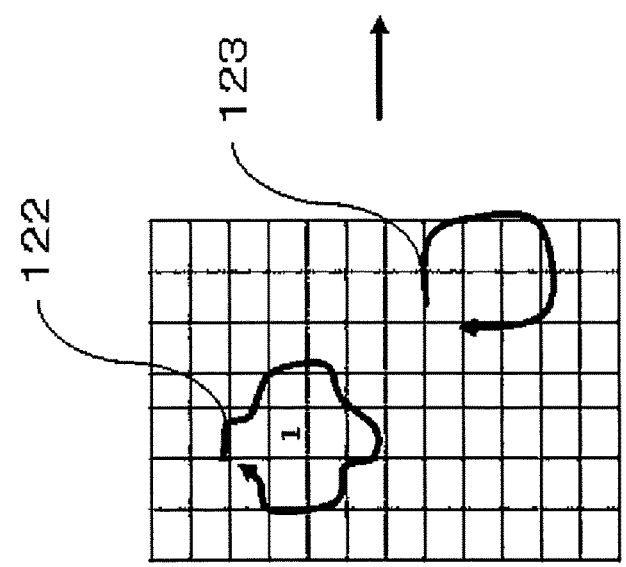
Figure 12A:
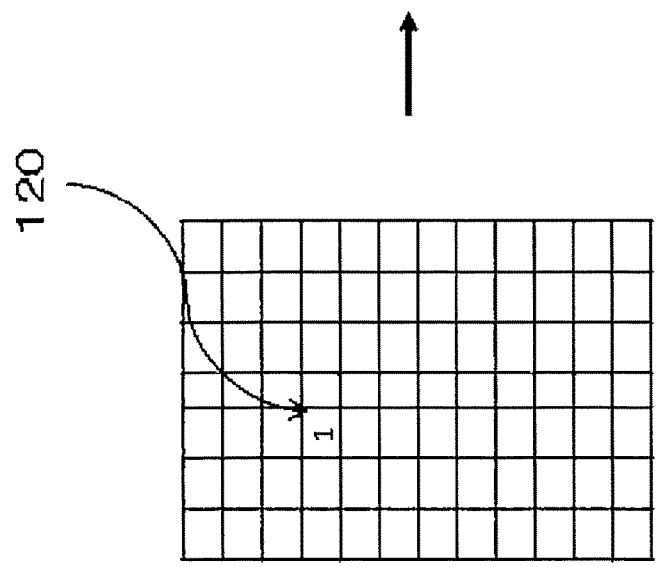

FIG. 12A, FIG. 12B, and FIG. 12C are diagrams for explaining a case of conducting the process of step S703 illustrated in FIG. 5, FIG. 9, and FIG. 10 at the first time by using examples depicted in FIG. 2 and FIG. 6 in the first embodiment.

As described above by referring to FIG. 11, when the detection position 120 is detected as the maximum peak detection position 110max in the peak position specification part 40, a label "1" is assigned to the detection position 120 by the outline tracing part 51 as illustrated in FIG. 12A.

Therefore, the outline tracing part 51 conducts the outline tracing process based on the detection data 100 of the detection position 120. The outline tracing part 51 calculates the first threshold Th_Finger_p, and forms an outline 122 and an outline 123 by the outline trace based on the first threshold Th_Finger_p. In this example, the first threshold Th_Finger_p indicates "41". In particular, as illustrated in FIG. 12B, the outline tracing part 51 forms the outline as the detection position 105 greater than the first threshold Th_Finger_p is in the range of the object among the detection positions 105 surrounding the detection position 120.

After the above described outline trace, the label determination part 52 conducts a process filling an inside of the outline formed by the outline tracing part 51 with the labels. As illustrated in FIG. 12C, because the label "1" alone exists inside the outline 122 at the upper left, the label determination part 52 assigns the label "1" to all detection positions 105 inside the outline 122 at the upper left. Since the outline 123 does not include the label inside, the label determination part 52 does not assign the label this time. Object range data 124, to which the label "1" has been assigned because a first process illustrated in FIG. 12A, FIG. 12B, and FIG. 12C, are acquired.

Figure 13:
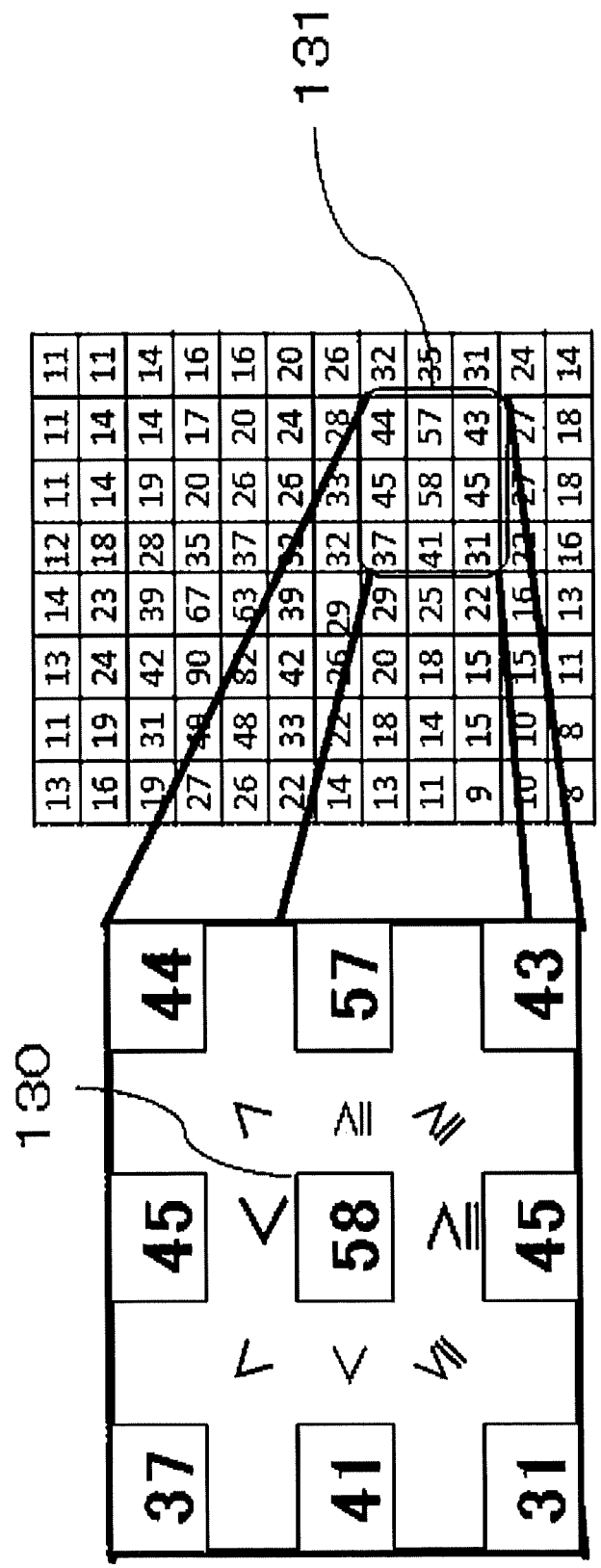
FIG. 13 is a diagram for explaining a case of conducting the detection process of the maximum peak detection position at a second time by using the examples illustrated in FIG. 2 and FIG. 6, in the first embodiment.

FIG. 13 is a diagram for explaining a case of conducting the process of step S702 illustrated in FIG. 5 and FIG. 8 at a second time in the first embodiment.

Following the process of step S703 illustrated in FIG. 5 described by using FIG. 12A, FIG. 12B, and FIG. 12C, the process of step S701 illustrated in FIG. 13 is conducted.

Since the first process described by referring to FIG. 12A through FIG. 12C is terminated, the label of "1" has been already assigned to the detection position 120, which is a previous maximum peak detection position 110max, such that the detection position 120 is not selected as the maximum peak detection position 110max.

Next, as illustrated in FIG. 13, a detection position 130, which is a detection position 105 having the detection data 100x of "58" being a second greatest value, is detected as the maximum peak detection position 110max. "58" is greater than a value "20" of the second threshold Th_Exist, the label is not assigned to the detection position 130, and "58" is greater than the detection data 100 of the detection position 105 of the eight neighbors at the surrounding as illustrated in surrounding data 131.

FIG. 14A through FIG. 14C are diagrams for explaining a case of conducting the process of step S703 illustrated in FIG. 5, FIG. 9, and FIG. 10 at a second time by using the examples of FIG. 2 and FIG. 6 in the first embodiment.

As described by referring to FIG. 13, at the peak position specification part 40, when detecting the detection position 130 as the maximum peak detection position 110max, a label "2" is assigned to the detection position 130 by the outline tracing part 51, as illustrated in FIG. 14A.

Next, the outline tracing part 51 conducts the outline processing process based on the detection data 100x of the detection position 130. The outline tracing part 51 calculates the first threshold Th_Finger_p, and forms an outline 133 by the outline trace based on this threshold. In the present embodiment, the first threshold Th_Finger_p indicates "31". In particular, as illustrated in FIG. 14B, the outline tracing part 51 forms the outline 133 as a detection position 105 greater than the first threshold Th_Finger_p is in the range of the object among the detection positions 105 surrounding the detection position 120.

After the above described outline trace, the label determination part 52 conducts the process for filling the inside of the outline formed by the outline tracing part 51. As illustrated in FIG. 14B, the label "1" and the label "2" exist inside the outline 133.

The label determination part 52 calculates a distance d_1 toward the label "1" and a distance d_2 toward the label "2" from respective coordinates of the detection positions 105 in the outline 133. Then, the label determination part 52 assigns a label having a shorter distance between the distance d_1 and the distanced_2.

As a result, in the process at the second time, an object range data 134 where the label "1" and the label "2" are assigned is obtained.

Following the process of step S703 illustrated in FIG. 5 described by referring to FIG. 14A through FIG. 14C, the process of step S701 depicted in FIG. 13 at a third time will be conducted.

Since the process at the second time described by referring to FIG. 14A through FIG. 14C ends, "1" of the label has been already assigned to the detection position 120 being the maximum peak detection position 110max at the first time. Since "2" of the label has been already assigned at the detection position 130 being the maximum peak detection position 110max at the second time, these detection positions 120 and 130 are not selected as the maximum peak detection position 110max in the process at the third time.

Figure 15B:
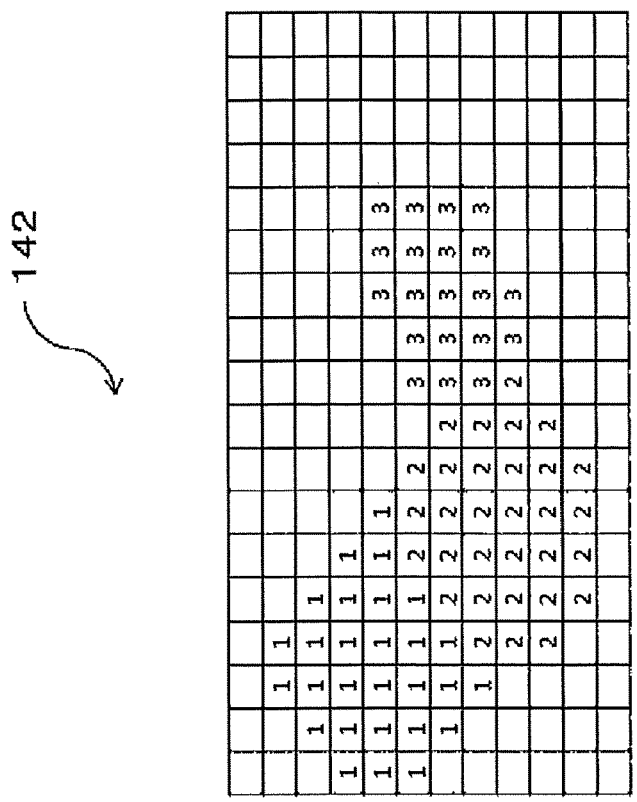
FIG. 15A and FIG. 15B are diagrams for explaining a case of conducting the detection process of the maximum peak detection position, the outline tracing process, and the label assigning process at a third time by using the examples illustrated in FIG. 2 and FIG. 6, in the first embodiment.
Figure 15A:
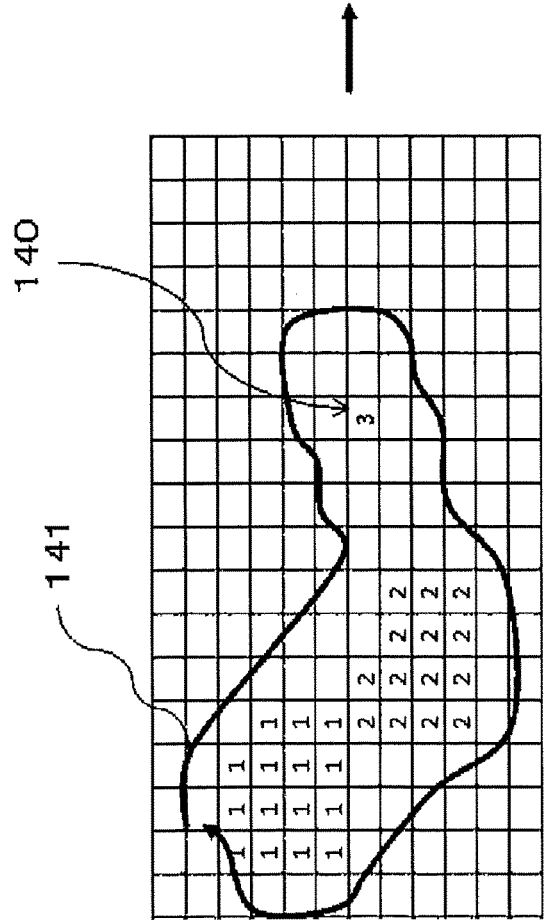

Therefore, as illustrated in FIG. 15A, a detection position 140, which is the detection position 105 having the detection data of a third greatest "31", is detected as the maximum peak detection position 110max.

FIG. 15A and FIG. 15B are diagrams for explaining a case of conducting the process of step S703 illustrated in FIG. 5, FIG. 9, and FIG. 10 at a third time by using the examples of FIG. 2 and FIG. 6 in the first embodiment.

As described above, at the peak position specification part 40, when the detection position 140 is detected as the maximum peak detection position 110max, by the outline tracing part 51, as illustrated in FIG. 15A, a label "3" is assigned to the detection position 140

As described above, at the peak position specification part 40, when the detection position 140 is detected as the maximum peak detection position 110max, by the outline tracing part 51, as illustrated in FIG. 15A, the label "3" is assigned to the detection position 140.

Next, the outline tracing part 51 conducts the outline tracing process based on the detection data 100 of the detection position 130. The outline tracing part 51 calculates "19" as the first threshold Th_Finger_p, and forms an outline 141 by the outline trace based on this threshold.

After the outline trace described above, the label determination part 52 conducts the process for filling the label inside the outline formed by the outline tracing part 51. As illustrated FIG. 15B, the label "1", the label "2", and the label "3" exist inside the outline 141.

The label determination part 52 calculates the distance d_1 toward the coordinates of the label "1", the distance d_2 toward the coordinates of the label "2", and the distance d_3 toward the coordinates of the label "3", from the respective coordinates of the detection positions 105 inside the outline 141. Next, the label determination part 52 assigns a label having a shorter distance among the distance d_1, the distance d_2, and the distance d_3, to each of the detection positions 105.

As a result, in the process at the third time, as illustrated in FIG. 15B, an object range data 142, to which the label "1", the label "2", and the label "3" are assigned, are obtained.

Figure 16:
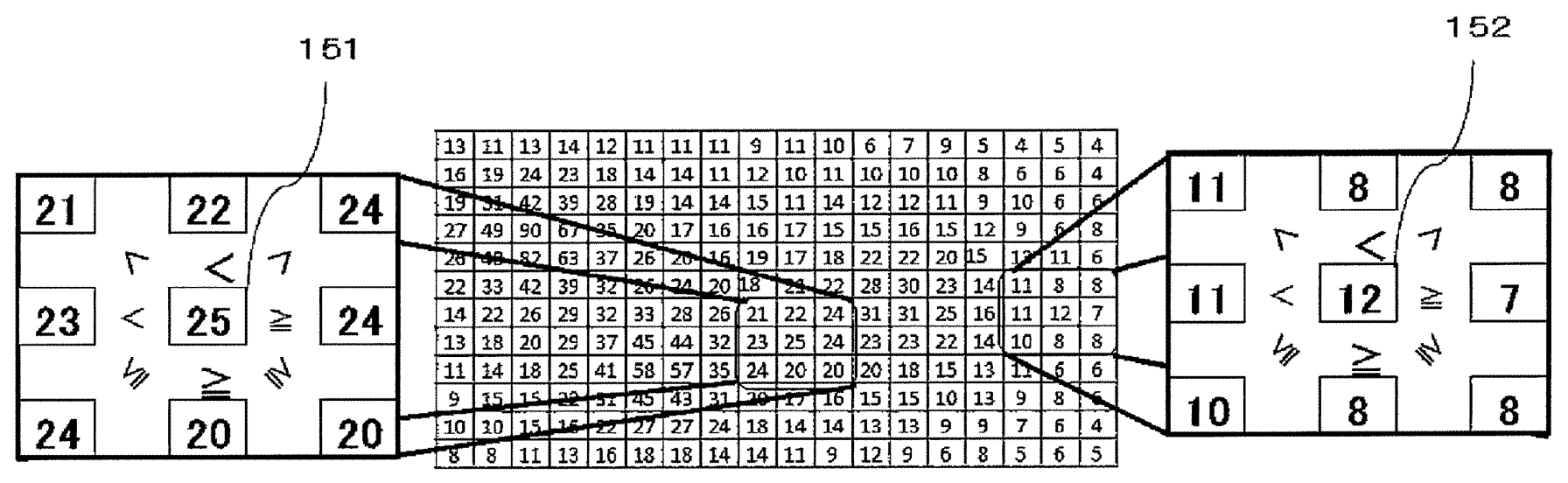

FIG. 16 is a diagram for explaining a case of conducting the process of step S703 illustrated in FIG. 5, FIG. 9, and FIG. 10 at a fourth time (last time) by using the examples of FIG. 2 and FIG. 6 in the first embodiment.

As illustrated in FIG. 16, in the detection data 100, a detection position 151 having a fourth greatest value "25"; however, since the label "3" has been already assigned by the label assigning process described by referring to FIG. 15A and FIG. 15B, this detection position 151 does not become a candidate of the maximum peak detection position 110max.

Moreover, a detection position 152 having a fifth greatest value "12" includes detection data 100 greater than eight neighbors at its surrounding; however, because this value is smaller than "20" of the second threshold Th_Exist, this position does not become the peak detection position 110. The second threshold Th_Exist is provided in a condition of the peak detection position 110 to prevent recognition of peaks as fingers due to noise. An appropriate value is selected as the second threshold Th_Exist based on noise tolerance of a sensor. As described above, in the process at the fourth time illustrated in FIG. 16, the maximum peak detection position 110max is not detected. Hence, the adjacent region specification part 20 acquires the negative determination (No) in step S702 illustrated in FIG. 5, a position specifying process (S704) by the position specification part 60 depicted in FIG. 5 is finally conducted based on object range data 412 illustrated in FIG. 15A and FIG. 15B.

As described above, according to the input device of the present embodiment, because a plurality of peak detection positions are detected, and the label is assigned for each of the peak detection positions concerning the detection positions at its surrounding, an object can be discriminated as the peak detection position is set to be a center. Since each of adjacent regions having the peak detection position can be labeled, it is possible to specify an appropriate adjacent regions excluding a detection position which may be noise; accordingly, it is possible to improve accuracy of separating and recognizing an object. In particular, it is possible to provide the input device capable of conducting recognitions of a plurality of objects having different shapes and distances.

In particular, because the first threshold is set as a reference and the outline is specified, the adjacent region is specified and separated for each of the specified outlines. Moreover, because the label assigning process is conducted for each of the outlines, it is possible to label each of the outlines having the peak detection positions inside and to specify the range of the object while excluding a region to be noise to which the label is not assigned.

Moreover, when there are two or more label candidates inside one outline, it is possible to adjust an assignment among the label candidates so as to distribute one label to these candidates. Accordingly, it is possible to resolve confusion that multiple labels are assigned with respect to each of outlines, and it is possible to simplify and section into two outlines: one is of that the label is assigned and another is of that the label is not assigned, and it is possible to resolve confusion when objects are separated and recognized.

Moreover, by preventing from detecting a detection position having greater detection data as a peak position even if there are greater detection data in surrounding detection positions and also by preventing from determining a detection position in which detection data of the detection position itself are small even if the detection data are greater than the surrounding detection positions, it is possible to appropriately specify the peak detection position. Then, because it is possible to appropriately determine the second threshold Th_Exist, and an appropriate peak detection position is specified, it is possible to specify an appropriate adjacent region excluding a detection position to be noise.

Second Embodiment

Also, in a second embodiment, a basic configuration and process flow is the same as the first embodiment. In the first embodiment, a case of repeating the detection process of the maximum peak detection position 110max every time the outline tracing process and the label assigning process is illustrated; however, in the second embodiment, before the outline tracing process and the label assigning process, all peak detection positions 110, to which a process is conducted sequentially as the maximum peak detection position 110max are detected. Thereby, it is possible to reduce a process time.

A functional block of the input device of the second embodiment is the same as that of the first embodiment illustrated in FIG. 4.

Figure 17:
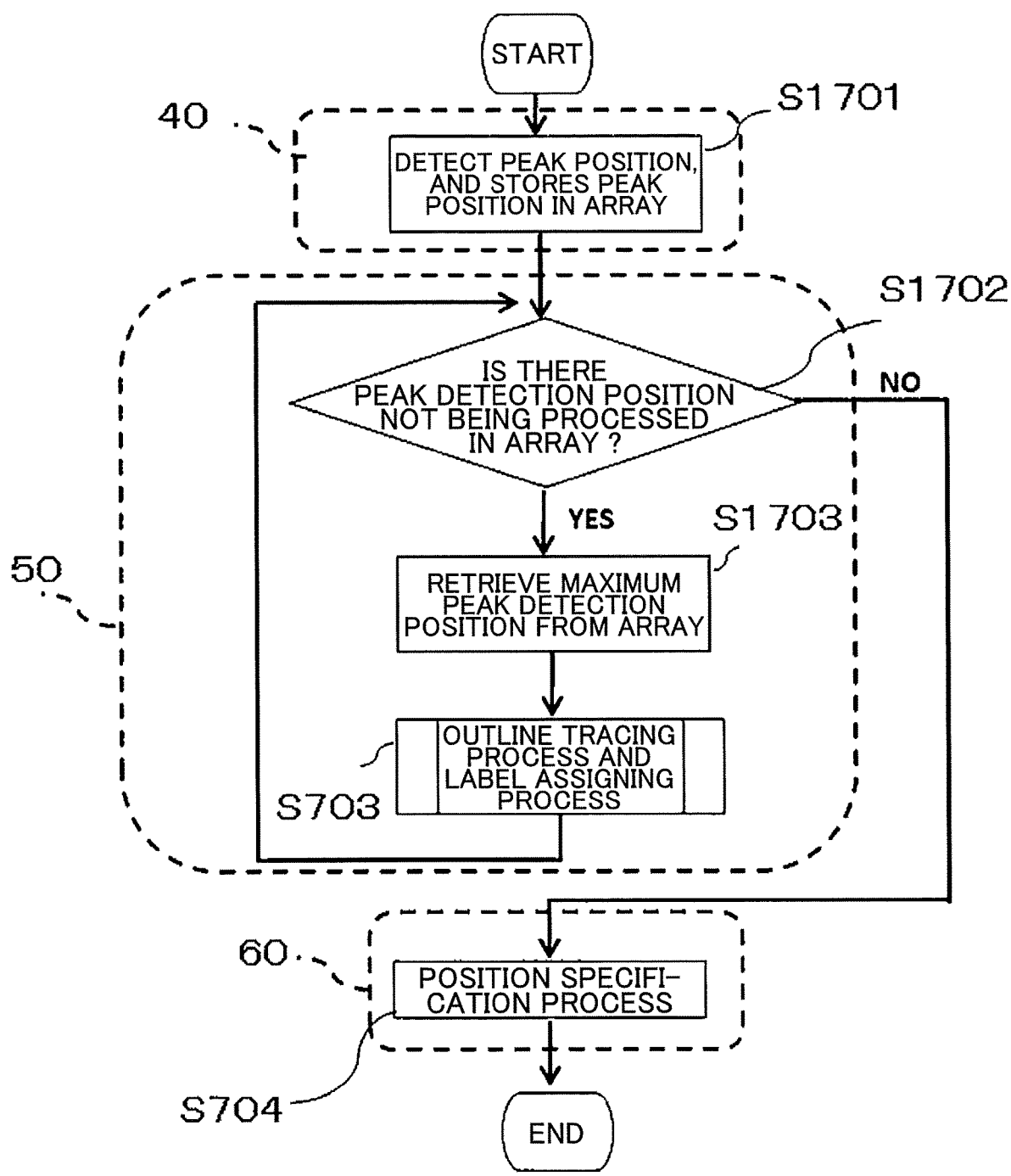
FIG. 17 is a flowchart for explaining a process of the adjacent region specification part depicted in FIG. 4 in a second embodiment.

FIG. 17 is a flowchart for explaining a process of the adjacent region specification part illustrated in FIG. 4 of the second embodiment.

Step S1701:

The peak position specification part 40 detects a detection position 105, of which the detection data 100$x$ is greater than or equal to the second threshold Th_Exist and is greater than surrounding detection positions 105, as the peak detection position 110 based on the detection data 100 input from the sensor part 10, stores the detection position 105 in array Peaks.

At this time, the peak position specification part 40 stores the peak detection position 110 to the array Peaks to arrange the detection data 100$x$ in a descending order. Thereby, the detection data 100$x$ of a beginning of the array Peaks indicate the greatest peak detection position 110. The examples illustrated in FIG. 2 and FIG. 6, the detection data 100$x$ are stored in the array Peaks in an order of peak detection positions 110 of "90", "58", "31", and "25".

Step S1702:

The outline tracing part 51 determines whether there is a peak detection position 110, to which step S703 is not conducted, in the array Peaks, advances to step S1703 in a case of a position determination (yes), and advances to step S1704 in a case of a negative determination (no).

Step S1703:

The outline tracing part 51 retrieves the peak detection position 110 not being conducted from the beginning of the array Peaks as the maximum peak detection position 110max.

Step S703:

The outline tracing part 51 conducts the outline tracing process and the label assigning process regarding the maximum peak detection position 110max retrieved in step S1703.

Then, the outline tracing process and the label assign process of the present embodiment conduct processes basically similar to processes of steps S902 and S903 illustrated in FIG. 9 and a process illustrated in FIG. 10, which describe the maximum peak detection position 110max retrieved from the array Peaks.

At these processes, the outline tracing part 51 moves the peak detection process 110 retrieved from the beginning of the array Peaks to a fixed peak array Fixed_Peak. Subsequently, the outline trace is conducted similar to the first embodiment, regarding the peak detection position 110 retrieved as the maximum peak detection position 110max from the beginning of the array Peaks.

When the peak detection position 110 (corresponding to the label) in the fixed peak array Fixed_Peak exists inside the outline, the outline tracing part 51 assigns the label of the peak detection position 110 with respect to the detection positions 105 inside the outline.

Also, when there are two or more peak detection positions 110 of the fixed peak array Fixed_Peak inside the outline, the outline tracing part 51 assigns the label of the peak detection position 110 having a closest distance with respect to the detection positions 105 inside the outline, similar to the first embodiment.

Moreover, when the peak detection position 110$s$ in the array Peaks are included in the outline with one or more peak detection position in the fixed peak array Fixed_Peak, the outline tracing part 51 moves the peak detection positions 110 in the array Peaks to a set Clear_Peaks of peak detection positions 110 not considered as the label of the of the peak detection positions 110 of the array Peaks.

Step S704:

The position specification part 60 specifies respective near positions of a plurality of objects based on the labels assigned by the label assigning part 50 in step S1703, in the same manner as the first embodiment.

At the aforementioned third outline trace as illustrated in FIG. 15A and FIG. 15B, in the fixed peak array Fixed_Peak, peak detection positions 110, where the detection data 100x indicate "90", "58", and "31", and a peak detection position 110, where the detection data 100x indicate "25" are stored.

When the outline tracing part 51 conduct the outline trace by using a value "19" as the first threshold Th_Finger_p, all peak detection positions 110, where the detection data 100x indicate "90", "58", and "31" in the fixed peak array Fixed_Peak are included inside the outline as illustrated in FIG. 6 and FIG. 15A. Simultaneously, the peak detection position 110, where the detection data 100x of the array Peaks indicate "25", is also included; however, because this peak detection position 110 is not a peak detection position 110, this peak detection position 110 is determined as a noise-derived peak, and is included in the set Clear_Peaks. Thereby, a result finally obtained is the same as a case of the first embodiment; however, because the peak detection positions 110 to select as the maximum peak detection position 110max are searched at one, it is possible to reduce a calculation time.

The present invention is not limited to the above described embodiments. That is, those skilled in the art may make various changes, combinations, sub-combinations, and substitutions for the constituent elements of the above-described embodiments within the technical scope of the present invention or the equivalent scope thereof.

In the above described embodiments, as depicted in FIG. 5 and FIG. 17, a case of conducting the position specifying process by the position specification part 60 after conducting the label assigning process for all detection positions 105 is illustrated. Alternatively, every time the label assigning process is conducted with respect to the maximum peak detection position 110max, the position specifying process by the position specification part 60 may be conducted.

Moreover, in the above described embodiments, a case of specifying the respective near positions of the plurality of objects is illustrated; alternatively, instead of specific positions, an adjacent region of the plurality of objects may be specified.

Furthermore, in the above described embodiments, a case of applying to the input device of the present invention is illustrated; alternatively, the present invention may be applied to an object detection device for detecting adjacent regions or near positions of a plurality of objects.

In the above described embodiments, the invention is described on a basis of a user interface device, which inputs information by an operation of a finger or the like; however, the input device of the present invention is applicable widely for devices for inputting information depending on a change of the electrostatic capacitance of a detection electrode caused by proximity of any one of various objects, which are not limited to a human body.

Also, preferably, the peak position specification part of the input device of the present invention specifies a maximum peak detection position, in which the value of the detection data of a detection position satisfy a certain peak condition for one or more detection positions where the label is not assigned among the plurality of detection positions, before a beginning of the label assigning process by the label assigning part, the label assigning part conducts the label assigning process for the maximum peak detection position specified by the peak position specification part right before, and the peak position specification part specifies the maximum peak detection position after the label assigning process by the label assigning part.

According to this configuration, every time the label assigning process is conducted, it is possible to specify an appropriate maximum peak detection position based on a state after the label is assigned.

Preferably, the peak position specification part of the input device of the present invention specifies a plurality of peak detection positions where values of the detection data satisfy a certain peak condition before a beginning of the label assigning process by the label assigning part, and the label assigning part specifies a maximum peak detection position sequentially from the peak detection position having a greater value of the detection data among the plurality of peak detection positions being specified, and conducts the label assigning process for the maximum peak detection position.

According to this configuration, because the plurality of peak detection positions to be used sequentially as the maximum peak detection position are specified first, it is possible to improve an efficiency of a process.

Preferably, the label assigning part specifies, as an outline, detection positions which detection data are smaller than the detection data of the peak detection position to which the label assigning process is conducted, and conducts the label assigning process for the detection positions inside the outline.

According to this configuration, because the outline is specified on a basis of the first threshold, it is possible to specify and separate the adjacent region for each of the specified outlines. Moreover, because the label assigning process is conducted for each of the outlines, the label is assigned for each of the outlines having the peak detection position inside thereof, and it is possible to specify each range of the objects while excluding an region to be the noise to which the label is not assigned.

Preferably, the label assigning part assigns the label close to detection positions to the detection positions inside the outline when two or more labels exist inside the outline, for each of outlines being specified, and conducts a process for assigning the label with respect to the detection positions inside the outline when there is one label inside the outline.

According to this configuration, when there are two or more label candidates in one outline, it is possible to adjust an assignment between the label candidates so as to distribute one label. Accordingly, it is possible to resolve confusion that multiple labels are assigned with respect to each of outlines, and it is possible to simplify and section into two outlines: one is of that the label is assigned and another is of that the label is not assigned, and it is possible to resolve confusion when objects are separated and recognized.

Preferably, the peak position specification part specifies, as the peak detection position among the plurality of detection positions, one detection position where the detection data are greater than the second threshold and are greater than those of detection positions surrounding the one detection position.

According to this configuration, by preventing from detecting a detection position having greater detection data as a peak position even if there are greater detection data in surrounding detection positions and also by preventing from determining a detection position in which detection data of the detection position itself are small even if the detection data are greater than the surrounding detection positions, it is possible to appropriately specify the peak detection position.

Preferably, the peak position specification part determines the second threshold based on a maximum value of a change value of the detection data.

According to this configuration, because it is possible to appropriately determine the second threshold Th_Exist, and an appropriate peak detection position is specified, it is possible to specify an appropriate adjacent region excluding a detection position to be noise.

Preferably, the input device includes a position specification part configured to specify near positions of the plurality of objects, respectively, based on the label.

According to this configuration, because the near positions of the objects are specified in the adjacent region where the label is assigned, and it is possible to comprehend positions for respective labels.

Preferably, the position specification part obtains the near positions by calculating a barycentric value of the detection positions in the adjacent region where a same label is assigned.

According to this configuration, because it is possible to determine a position, by which a label can be appropriately specified, as the near position, it is possible to appropriately comprehend the position for each of the labels.

DESCRIPTION OF THE REFERENCE NUMERALS 1 input device
10 sensor part
11 detection part
12 sensor circuit
20 adjacent range specification part
30 PC
40 peak position specification part
50 label assigning part
51 outline tracing part
52 label determination part
60 position specification part
100 detection data
105 detection position
110 peak detection position
110max maximum peak detection position
Th_Finger_p first threshold
Th_Exist second threshold

What is claimed is:

1. An input device, comprising:
a sensor part configured to detect approaching states of a plurality of objects at a plurality of detection positions; and
an adjacent specification part configured to specify adjacent regions of the plurality of objects based on detection data from the sensor part,
wherein the adjacent region specification part includes
a peak position specification part configured to specify a peak detection position, of which a value of the detection data satisfies a certain peak condition among the plurality of detection positions, and
a label assigning part configured to conduct a label assigning process that assigns a label applied at the peak detection position to one or more detection positions among surrounding detection positions of the peak detection position, in a case that
the label has not been assigned to the one or more detection positions, and that
each of the one or more detection positions has the detection data indicating that the value is greater than or equal to a first threshold defined based on the detection data of the peak detection position being specified,
wherein the label assigning part specifies, as an outline, detection positions of which the value of the detection data is greater than or equal to the first threshold being smaller than the value of the detection data of the peak detection position, in order to conduct the label assigning process, and conducts the label assigning process for the detection positions inside the outline.

2. The input device as claimed in claim 1, wherein
the peak position specification part specifies a maximum peak detection position, in which the value of the detection data of a detection position satisfy a certain peak condition for the one or more detection positions where the label is not assigned among the plurality of detection positions, before a beginning of the label assigning process by the label assigning part,
the label assigning part conducts the label assigning process for the maximum peak detection position specified by the peak position specification part right before, and
the peak position specification part specifies the maximum peak detection position after the label assigning process by the label assigning part.

3. The input device as claimed in claim 2, wherein the label assigning part conducts the label assigning process for all maximum peak detection positions.

4. The input device as claimed in claim 1, wherein
the peak position specification part specifies a plurality of peak detection positions where values of the detection data satisfy a certain peak condition before a beginning of the label assigning process by the label assigning part, and
the label assigning part specifies a maximum peak detection position sequentially from the peak detection position having a greater value of the detection data among the plurality of peak detection positions being specified, and conducts the label assigning process for the maximum peak detection position.

5. The input device as claimed in claim 1, wherein the label assigning part assigns the label close to detection positions to the detection positions inside the outline when two or more labels exist inside the outline, for each of outlines being specified, and conducts a process for assigning the label with respect to the detection positions inside the outline when there is one label inside the outline.

6. The input device as claimed in claim 1, wherein the peak position specification part specifies, as the peak detection position among the plurality of detection positions, one detection position where the detection data are greater than a second threshold and are greater than those of detection positions surrounding the one detection position.

7. The input device as claimed in claim 6, wherein the peak position specification part determines the second threshold based on a maximum value of a change value of the detection data.

8. The input device as claimed in claim 1, further comprising:
a position specification part configured to specify near positions of the plurality of objects, respectively, based on the label.

9. The input device as claimed in claim 8, wherein the position specification part obtains the near positions by calculating a barycentric value of the detection positions in the adjacent region where a same label is assigned.

10. An object detection device, comprising:
a peak specification part configured to specify a peak detection position, of which a value of detection data satisfies a certain peak condition among a plurality of detection positions, based on the detection data indicating approaching states of a plurality of objects at the plurality of detection positions; and
a label assigning part configured to conduct a label assigning process that assigns a label applied at the peak detection position to one or more detection positions among surrounding detection positions of the peak detection position, in a case that
the label has not been assigned to the one or more detection positions, and that
each of the one or more detection positions has the detection data indicating that the value is greater than or equal to a first threshold defined based on the detection data of the peak detection position being specified,
wherein the label assigning part specifies, as an outline, detection positions of which the value of the detection data is greater than or equal to the first threshold being smaller than the value of the detection data of the peak detection position, in order to conduct the label assigning process, and conducts the label assigning process for the detection positions inside the outline.

11. An object detection method, comprising:
a peak specification step for specifying a peak detection position, of which a value of detection data satisfies a certain peak condition among a plurality of detection positions, based on the detection data indicating approaching states of a plurality of objects at the plurality of detection positions; and
a label assigning step for conducting a label assigning process that assigns a label applied at the peak detection position to one or more detection positions among surrounding detection positions of the peak detection position, in a case that
the label has not been assigned to the one or more detection positions, and that
each of the one or more detection positions has the detection data indicating that the value is greater than or equal to a first threshold defined based on the detection data of the peak detection position being specified,
wherein the label assigning part specifies, as an outline, detection positions of which the value of the detection data is greater than or equal to the first threshold being smaller than the value of the detection data of the peak detection position, in order to conduct the label assigning process, and conducts the label assigning process for the detection positions inside the outline.

* * * * *